(12) United States Patent
Kim

(10) Patent No.: US 7,834,925 B2
(45) Date of Patent: Nov. 16, 2010

(54) LENS SHADING CORRECTION DEVICE AND METHOD IN IMAGE SENSOR

(75) Inventor: Min Seok Kim, Seoul (KR)

(73) Assignee: Core Logic Inc., Seoul (KR)

( * ) Notice: Subject to any disclaimer, the term of this patent is extended or adjusted under 35 U.S.C. 154(b) by 609 days.

(21) Appl. No.: 11/756,352

(22) Filed: May 31, 2007

(65) Prior Publication Data

US 2007/0285552 A1 Dec. 13, 2007

(30) Foreign Application Priority Data

| Jun. 5, 2006 | (KR) | ............ 10-2006-0050213 |
| Jun. 5, 2006 | (KR) | ............ 10-2006-0050216 |
| Jun. 5, 2006 | (KR) | ............ 10-2006-0050218 |

(51) Int. Cl.
- *G02B 13/16* (2006.01)
- *H04N 9/64* (2006.01)
- *G06K 9/00* (2006.01)
- *G06K 9/40* (2006.01)

(52) U.S. Cl. ............ 348/335; 348/251; 382/167; 382/274

(58) Field of Classification Search ............ 348/335, 348/251; 382/167, 274
See application file for complete search history.

(56) References Cited

U.S. PATENT DOCUMENTS

| 5,592,218 | A * | 1/1997 | Ochiai et al. ........ 348/110 |
| 7,386,185 | B2 * | 6/2008 | Watanabe et al. ...... 382/274 |
| 2003/0234785 | A1* | 12/2003 | Matsuda et al. ....... 345/426 |
| 2004/0196303 | A1* | 10/2004 | Matsuda ............... 345/690 |
| 2005/0099504 | A1* | 5/2005 | Nayar et al. .......... 348/222.1 |
| 2005/0248670 | A1* | 11/2005 | Jung ................... 348/242 |
| 2006/0147200 | A1* | 7/2006 | Arimoto et al. ........ 396/529 |
| 2006/0244848 | A1* | 11/2006 | Hori ................... 348/251 |
| 2009/0051792 | A1* | 2/2009 | Arimoto et al. ........ 348/251 |

FOREIGN PATENT DOCUMENTS

| KR | 10-2006-0016648 | 2/2006 |
| WO | WO 2006/019209 A1 | 2/2006 |

* cited by examiner

*Primary Examiner*—Sinh Tran
*Assistant Examiner*—Christopher K Peterson
(74) *Attorney, Agent, or Firm*—Foley & Lardner LLP

(57) ABSTRACT

Provided is a lens shading correction device and method in an image sensor. The device comprises a brightness weight storage unit, an input image divider, and an input image brightness correction unit. The brightness weight storage unit stores a brightness weight for allowing one of representative brightness values to be a representative brightness value of a reference image block having a maximal representative brightness value. The input image divider blocks and divides an input image into input image blocks. The input image brightness correction unit corrects a brightness of the input image by multiplying brightness of input pixels by brightness weights.

18 Claims, 19 Drawing Sheets

PRIOR ART

PRIOR ART

LENS SHADING CORRECTION DEVICE AND METHOD IN IMAGE SENSOR

RELATED APPLICATIONS

This Nonprovisional application claims priorities under 35 U.S.C. §119(a) on Patent Applications No. 10-2006-0050213, 10-2006-0050216, 10-2006-0050218 filed in Republic of Korea on Jun. 5, 2006, the entire contents of which are incorporated herein by reference.

BACKGROUND OF THE INVENTION

1. Field of the Invention

The present invention relates to a lens shading correction device and method in an image sensor.

2. Description of the Background Art

An image sensor, a device for photographing an image using the properties of semiconductor reacting to light, is a device for sensing, by a pixel, brightness and wavelength of each different light emitted from respective objects and converting the sensed light into an electrical value. The function of the image sensor is to convert the electrical value into a level for signal processing.

In detail, the image sensor is a semiconductor device for converting an optical image into an electrical signal. Of the image sensors, Charge Coupled Device (CCD) is a device in which Metal Oxide Semiconductor (MOS) capacitors are located very close to each other and store and transfer charges, respectively. A Complementary Metal Oxide Semiconductor (CMOS) image sensor uses a CMOS technology in which a control circuit and a signal processing circuit are used as a peripheral circuit and employs a switching mechanism in which an output is detected sequentially using MOS transistors provided as many as the number of pixels.

The CMOS image sensor is of great use to a personal mobile system such as a mobile phone because of a great advantage of low power consumption. Thus, the CMOS image sensor is diversely applicable to a Personal Computer (PC) camera, for use in medical science, a toy, etc.

In the image sensor generally photographing an optical image of an object through a lens, there occurs a lens-shading phenomenon in which a brightness of an edge region of a photographed image gets lower than a brightness of a central region under the influence of a convex lens shape.

FIG. 1 illustrates the lens-shading phenomenon. Referring to FIG. 1, as a lens transmits light, an edge region of the lens is reduced in brightness compared to a central region.

If light in which the edge region is reduced in brightness is incident on the image sensor, an edge region of a displayed image is reduced in brightness. A magnitude of lens shading is dependent on a wavelength of light emitted from an object.

FIG. 2 illustrates a lens-shading phenomenon based on R, G, and B (Red, Green and Blue) color information.

Referring to FIG. 2, as a lens transmits a light emitted from an object, an edge region of the lens is reduced in brightness compared to a central region. A degree of brightness reduction is different depending on Red (R), Green (G), and Blue (B) color information considering wavelength information on light.

If light in which a magnitude of brightness reduction at the edge region is different depending on the R, G, and B color information that is incident on the image sensor, there occur drawbacks as follows.

(1) The edge region of the displayed image is reduced in brightness.

(2) The expression of gray level based on the R, G, and B color information is distorted in an image region corresponding to the edge region of the lens, thereby making it impossible to display accurate color and increasing a lattice noise. This is in contrast to the expression of gray level based on the R, G, and B color information that can be made without distortion in an image region corresponding to the central region of the lens.

Tables 1 and 2 are provided below to describe the lattice noise.

TABLE 1

| Brightness based on Gr and Gb color information in image region corresponding to central region of lens | | | | |
|---|---|---|---|---|
| 126 |  | 127 |  | 126 |
|  | 129 |  | 129 |  |
| 128 |  | 128 |  | 127 |
|  | 129 |  | 130 |  |
| 126 |  | 127 |  | 126 |

TABLE 2

| Brightness based on Gr and Gb color information in image region corresponding to edge region of lens | | | | |
|---|---|---|---|---|
| 126 |  | 127 |  | 126 |
|  | 148 |  | 150 |  |
| 128 |  | 128 |  | 127 |
|  | 149 |  | 151 |  |
| 126 |  | 127 |  | 126 |

As known from Tables 1 and 2, there does not occur a lattice noise in the image region corresponding to the central region of the lens because brightness based on Gr and Gb color information are almost consistent, but there occurs a lattice noise in the image region corresponding to the edge region of the lens because there is a great difference between brightness based on Gr and Gb color information.

A magnitude of lens shading is different depending on an object photographing environment, that is, depending on brightness.

If light in which a magnitude of brightness reduction at the edge region is different depending on the R, G, and B color information is incident on the image sensor, there occur drawbacks as follows.

(1) The edge region of the displayed image is reduced in brightness.

(2) The expression of gray level based on the R, G, and B color information is distorted in the image region corresponding to the edge region of the lens, thereby making it impossible to display accurate color. This is in contrast to the expression of gray level based on the R, G, and B color information that can be made without distortion in the image region corresponding to the central region of the lens.

(3) The expression of gray level based on the R, G, and B color information is distorted in the image region corresponding to the edge region of the lens because of a change of a brightness environment, thereby making it impossible to display accurate color in the edge region.

Such a lens-shading phenomenon is an important cause of a reduction of a quality of the image sensor.

SUMMARY OF THE INVENTION

Accordingly, the present invention is to correct a phenomenon of lens shading of an image sensor and improve a quality of an image sensor.

Also, the present invention is to provide a lens shading correction device and method in an image sensor, for providing a solution to a problem that an edge region of a displayed image is reduced in brightness, thereby improving a quality of the image sensor.

Also, the present invention is to provide a lens shading correction device and method in an image sensor, for providing a solution to a problem that the expression of gray level based on Red, Green, Blue color information is distorted in an image region corresponding to an edge region of a lens, thereby displaying accurate color and reducing a lattice noise in the image region corresponding to the edge region of the lens.

Also, the present invention is to provide a lens shading correction device and method in an image sensor, for providing a solution to a problem that the expression of gray level based on Red, Green, Blue color information is distorted in an image region corresponding to an edge region of a lens because of a change of a brightness environment in which an object is photographed, thereby realizing a stable color display despite the change of the brightness environment.

In one aspect, there is provided a lens shading correction device in an image sensor. The device comprises a brightness weight storage unit, an input image divider, and an input image brightness correction unit. The brightness weight storage unit stores a brightness weight for allowing one of representative brightness values of reference image blocks constituting a reference image to be a representative brightness value of a reference image block having a maximal representative brightness value among the reference image blocks. The input image divider blocks and divides an input image into input image blocks, corresponding to the reference image blocks. The input image brightness correction unit corrects a brightness of the input image by multiplying brightness of input pixels comprised in the input image blocks by brightness weights of the reference image blocks corresponding to the input image blocks.

The reference image may be a monochromatic image.

The representative brightness value of the reference image block may be an average of brightness values of reference image pixels comprised in the reference image block.

The brightness of the input pixel may be determined by linearly interpolating brightness of four corner parts of the input image block comprising the input pixel.

In another aspect, there is provided a lens shading correction method in an image sensor. The method comprises storing a brightness weight for allowing one of representative brightness values of reference image blocks constituting a reference image to be a representative brightness value of a reference image block having a maximal representative brightness value among the reference image blocks; blocking and dividing an input image into input image blocks, corresponding to the reference image blocks; and correcting a brightness of the input image by multiplying brightness of input pixels comprised in the input image blocks by brightness weights of the reference image blocks corresponding to the input image blocks.

The reference image may be a monochromatic image.

The representative brightness value of the reference image block may be an average of brightness values of reference image pixels comprised in the reference image block.

The method may further comprise determining the brightness of the input pixel by linearly interpolating brightness of four corner parts of the input image block comprising the input pixel.

In a further another aspect, there is provided a lens shading correction device in an image sensor. The device comprises a brightness weight storage unit, an input image divider, and an input image color correction unit. The brightness weight storage unit stores a brightness weight, on a per-color-information basis, for allowing one of representative brightness values of reference image blocks constituting a reference image to be a representative brightness value of a reference image block having a maximal representative brightness value among the reference image blocks. The input image divider divides an input image into input image blocks, corresponding to the reference image blocks. The input image color correction unit corrects a color of the input image on the per-color-information basis by multiplying brightness of input pixels comprised in the input image blocks by brightness weights of the reference image blocks corresponding to the input image blocks.

The color information may be Red (R), Green (G), and Blue (B) color information or R, Gr, Gb, and B color information.

The reference image may be a monochromatic image.

The representative brightness value of the reference image block may be an average of brightness values of reference image pixels comprised in the reference image block.

The brightness of the input pixel may be determined by linearly interpolating brightness of four corner parts of the input image block comprising the input pixel.

In a yet another aspect, there is provided a lens shading correction method in an image sensor. The method comprises storing a brightness weight, on a per-color-information basis, for allowing one of representative brightness values of reference image blocks constituting a reference image to be a representative brightness value of a reference image block having a maximal representative brightness value among the reference image blocks; dividing an input image into input image blocks, corresponding to the reference image blocks; and correcting a color of the input image on the per-color-information basis by multiplying brightness of input pixels comprised in the input image blocks by brightness weights of the reference image blocks corresponding to the input image blocks.

The color information may be R, G, and B color information or R, Gr, Gb, and B color information.

The reference image may be a monochromatic image.

The representative brightness value of the reference image block may be an average of brightness values of reference image pixels comprised in the reference image block.

The method may further comprise determining the brightness of the input pixel by linearly interpolating brightness of four corner parts of the input image block comprising the input pixel.

In a still another aspect, there is provided a lens shading correction device in an image sensor. The device comprises a reference shading data storage unit and a brightness correction unit. The reference shading data storage unit stores reference shading data that are comprised of blocked brightness information on each of a plurality of reference images having a different average brightness and correspond to the plurality of reference images. The brightness correction unit corrects a brightness of an input pixel on the basis of reference shading data that is selected among the reference shading data depending on the brightness of the input pixel, and brightness information on a target block that is selected among the blocked brightness information of the selected reference shading data depending on coordinates of the input pixel.

The reference image may be divided into reference image blocks. The reference shading data may be comprised of brightness information comprising representative brightness values of the divided reference image blocks.

The reference shading data may be determined by extracting the representative brightness values of the reference image blocks at each R, Gr, Gb, and B color information.

The plurality of reference images may be acquired by photographing five monochromatic images having a different average brightness.

The representative brightness value of the reference image block may be an average of brightness values of reference image pixels comprised in the reference image blocks.

The representative brightness value of the reference image block may be an average of brightness values of partial reference image pixels of four corner parts of the reference image block.

A piece of reference shading data corresponding to a reference image having a minimal average brightness may be selected when the brightness of the input pixel is equal or less than the minimal average brightness. A piece of reference shading data corresponding to a reference image having a maximal average brightness may be selected when the brightness of the input pixel is equal or greater than the maximal average brightness.

First reference shading data corresponding to a reference image having a first average brightness greater than the brightness of the input pixel and second reference shading data corresponding to a reference image having a first average brightness smaller than the brightness of the input pixel may be selected when the brightness of the input pixel is greater than a minimal average brightness and smaller than a maximal average brightness.

Brightness weights of four corner parts of a target block may be determined by dividing a maximal representative brightness value among representative brightness values of reference image blocks comprised in the selected piece of reference shading data by brightness values of the four corner parts of the target block. A brightness weight of the input pixel may be determined by processing the brightness weights of the four corner parts by two-dimensional linear interpolation. The brightness of the input pixel may be corrected by multiplying the brightness of the input pixel by the brightness weight of the input pixel.

Four first brightness weights may be determined by dividing a maximal representative brightness value among representative brightness values of first reference image blocks comprised in the selected first reference shading data by each of brightness values of four corner parts of a first target block comprised in the first reference shading data. A first reference brightness weight may be determined by processing the first brightness weights by two-dimensional linear interpolation. Four second brightness weights may be determined by dividing a maximal representative brightness value among representative brightness values of second reference image blocks comprised in the selected second reference shading data by each of brightness values of four corner parts of a second target block comprised in the second reference shading data. A second reference brightness weight may be determined by processing the second brightness weights by two-dimensional linear interpolation. A brightness weight of the input pixel may be determined by processing, by proportional calculation, an average brightness between the first reference shading data and the second reference shading data, the first reference brightness weight, the second reference brightness weight, and the brightness of the input pixel. The brightness of the input pixel may be corrected by multiplying the brightness of the input pixel by the brightness weight of the input pixel.

In a still another aspect, there is provided a lens shading correction method in an image sensor. The method comprises reading reference shading data that are comprised of blocked brightness information on each of a plurality of reference images having a different average brightness and correspond to the plurality of reference images; and correcting a brightness of an input pixel on the basis of reference shading data that is selected among the reference shading data depending on the brightness of the input pixel, and brightness information on a target block that is selected among the blocked brightness information of the selected reference shading data depending on coordinates of the input pixel.

The reference image may be divided into reference image blocks. The reference shading data may be comprised of brightness information comprising representative brightness values of the divided reference image blocks.

The method may further comprise determining the reference shading data by extracting the representative brightness values of the reference image blocks at each R, Gr, Gb, and B color information.

The method may further comprise acquiring the plurality of reference images by photographing five monochromatic images having a different average brightness.

The representative brightness value of the reference image block may be an average of brightness values of reference image pixels comprised in the reference image blocks.

The representative brightness value of the reference image block may be an average of brightness values of partial reference image pixels of four corner parts of the reference image block.

The method may further comprise selecting a piece of reference shading data corresponding to a reference image having a minimal average brightness when the brightness of the input pixel is equal or less than the minimal average brightness; and selecting a piece of reference shading data corresponding to a reference image having a maximal average brightness when the brightness of the input pixel is equal or greater than the maximal average brightness.

The method may further comprising selecting first reference shading data corresponding to a reference image having a first average brightness greater than the brightness of the input pixel and second reference shading data corresponding to a reference image having a first average brightness smaller than the brightness of the input pixel, when the brightness of the input pixel is greater than a minimal average brightness and smaller than a maximal average brightness.

The method may further comprise determining brightness weights of four corner parts of a target block by dividing a maximal representative brightness value among representative brightness values of reference image blocks comprised in the selected piece of reference shading data by brightness values of the four corner parts; determining a brightness weight of the input pixel by processing the brightness weights of the four corner parts by two-dimensional linear interpolation; and correcting the brightness of the input pixel by multiplying the brightness of the input pixel by the brightness weight of the input pixel.

The method may further comprise determining four first brightness weights by dividing a maximal representative brightness value among representative brightness values of first reference image blocks comprised in the selected first reference shading data by each of brightness values of four corner parts of a first target block comprised in the first reference shading data; determining a first reference brightness weight by processing the first brightness weights by two-dimensional linear interpolation; determining four second brightness weights by dividing a maximal representative brightness value among representative brightness values of second reference image blocks comprised in the selected second reference shading data by each of brightness values of four corner parts of a second target block comprised in the second reference shading data; determining a second reference brightness weight by processing the second brightness weights by two-dimensional linear interpolation; determining a brightness weight of the input pixel by processing, by proportional calculation, an average brightness between the first reference shading data and the second reference shading data, the first reference brightness weight, the second reference brightness weight, and the brightness of the input pixel; and correcting the brightness of the input pixel by multiplying the brightness of the input pixel by the brightness weight of the input pixel.

It is to be understood that both the foregoing general description and the following detailed description are exemplary and explanatory and are intended to provide further explanation of the invention as claimed.

BRIEF DESCRIPTION OF THE DRAWINGS

The invention will be described in detail with reference to the following drawings in which like numerals refer to like elements.

DETAILED DESCRIPTION OF PREFERRED EMBODIMENT

Preferred embodiments of the present invention will be described in a more detailed manner with reference to the drawings.

Figure 1:
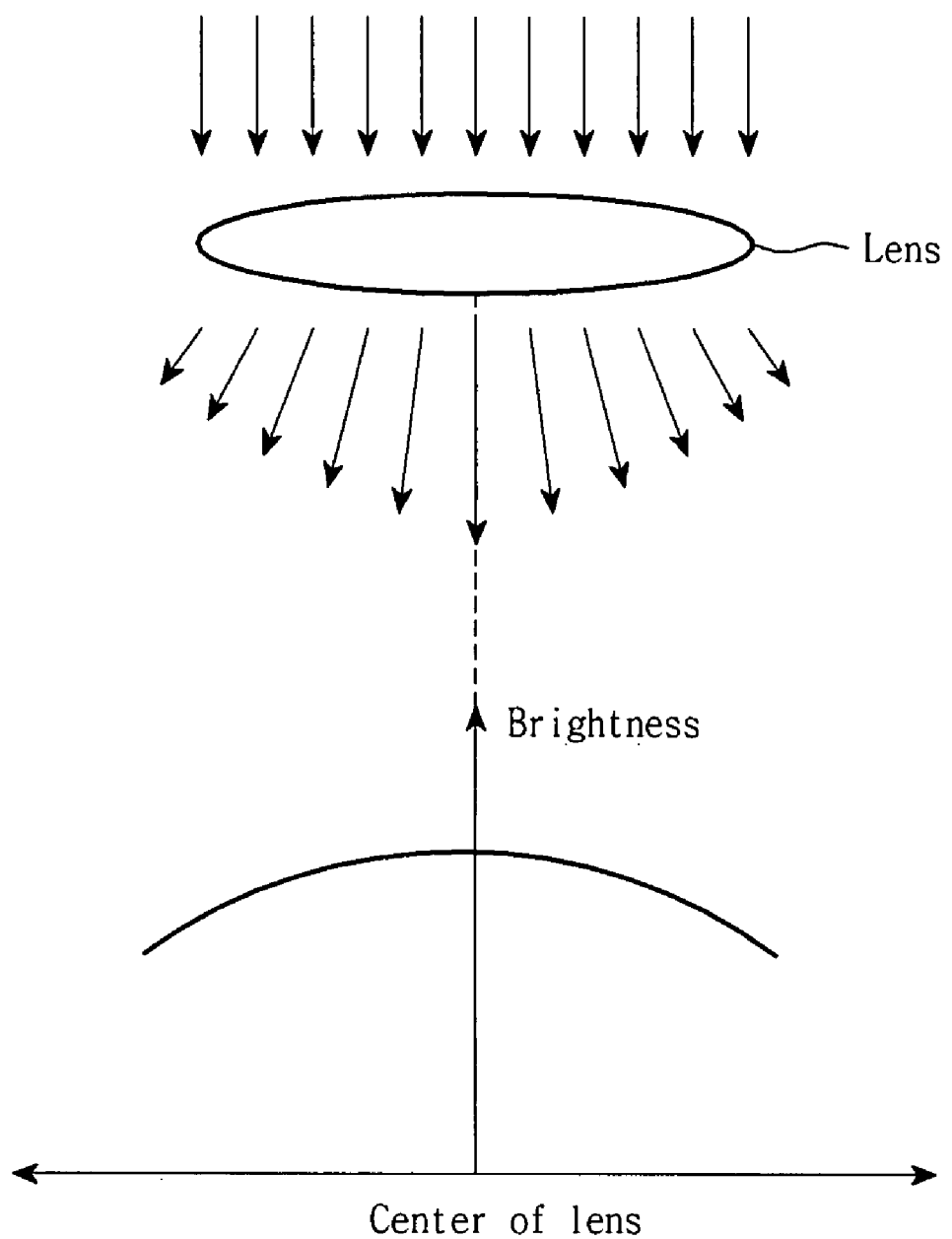
FIGS. 1 and 2 illustrate a lens-shading phenomenon.
Figure 2:
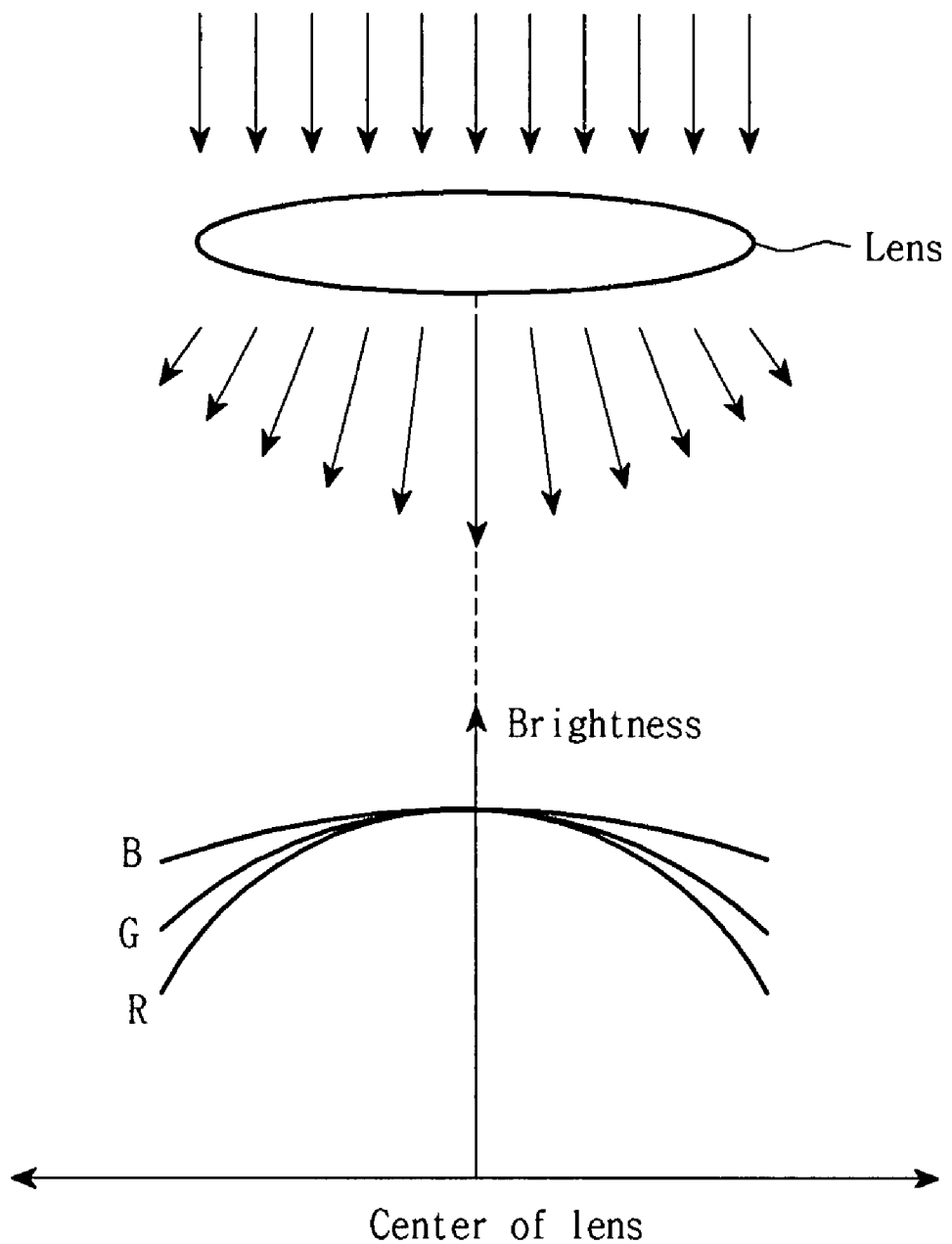
Figure 3:
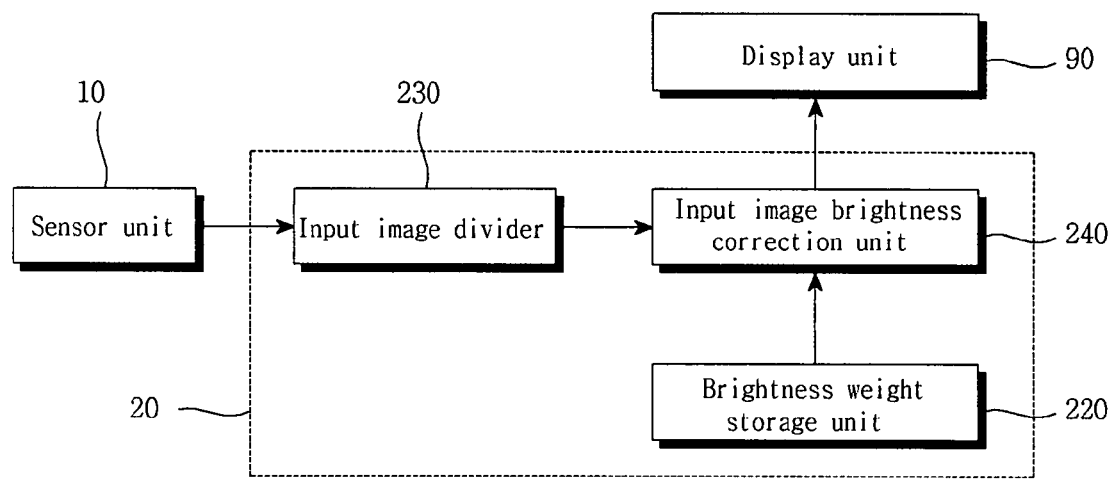
FIG. 3 is a block diagram illustrating a lens shading correction device in an image sensor according to a first exemplary embodiment of the present invention.

FIG. 3 is a block diagram illustrating a lens shading correction device in an image sensor according to a first exemplary embodiment of the present invention.

As shown in FIG. 3, the lens shading correction device 20 includes a brightness weight storage unit 220, an input image divider 230, and an input image brightness correction unit 240.

A description of a sensor unit 10 will be made prior to a description of the lens shading correction device 20 in the image sensor according to a first exemplary embodiment of the present invention.

The sensor unit 10 can comprise a color filter array, an analog-to-digital converter, and a lens unit that are not shown. The color filter array converts an optical object signal inputted through the lens unit into an electrical signal. The color filter array can use a Bayer pattern advantageous in resolution. The analog-to-digital converter converts an image signal converted in the color filter array into a digital signal and transmits the digital signal to the lens shading correction device 20 according to a first exemplary embodiment of the present invention.

The brightness weight storage unit 220 stores a brightness weight for allowing one of representative brightness values of reference image blocks constituting a reference image to be a representative brightness value of a reference image block having a maximal representative brightness value among the reference image blocks.

It is desirable that the reference image is a monochromatic image. The reference image can be acquired by photographing an object such as a white copy paper that has a uniform surface and emits a uniform amount of light from an entire surface. An example of the monochromatic image can be a white image obtained by photographing a white paper.

Figure 4A:
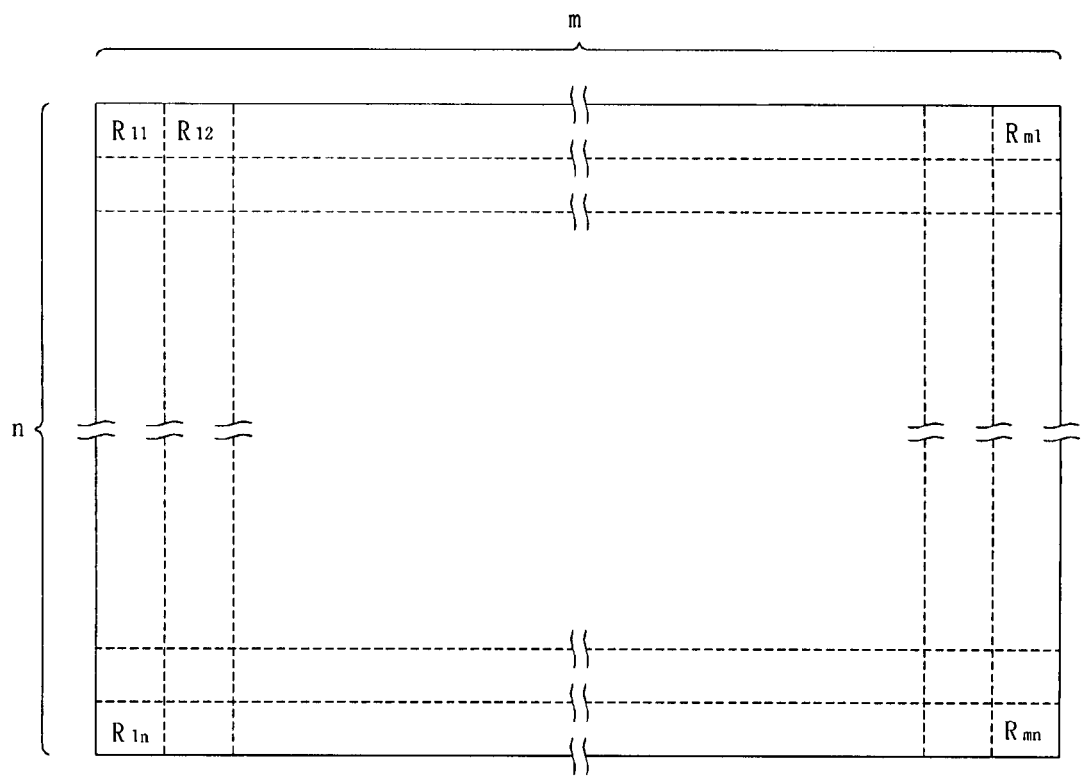
FIGS. 4(a) and 4(b) illustrate examples of dividing an image.

FIG. 4(a) illustrates an example of dividing a reference image.

As shown in FIG. 4(a), the reference image is divided into the m by n number of reference image blocks (R11, R12, ..., Rmn).

For instance, the reference image can be divided into the 32 by 24 number of a total of 768 reference image blocks.

Representative brightness values of the reference image blocks (R11, R12, ..., Rmn) are determined and brightness weights of the reference image blocks (R11, R12, ..., Rmn) are determined on the basis of a maximal representative brightness value and are stored in a recording medium such as a semiconductor chip.

It is desirable that the representative brightness value of the reference image block is determined by averaging brightness values of reference image pixels comprised in the reference image block.

A way of determining the brightness weights of the reference image blocks (R11, R12, ..., Rmn) is expressed in Equation 1:

$$A_{x,y} = \frac{B\max}{B_{x,y}}$$

where $A_{x,y}$: brightness weight of $x^{th}$ by $y^{th}$ reference image block, Bmax: maximal representative brightness value of representative brightness values of reference image blocks (R11, R12, ..., Rmn), and $B_{x,y}$: representative brightness value of $x^{th}$ by $y^{th}$ reference image block.

The input image divider 230 blocks and divides an input image into input image blocks, corresponding to the reference image blocks (R11, R12, ..., Rmn).

Figure 4B:
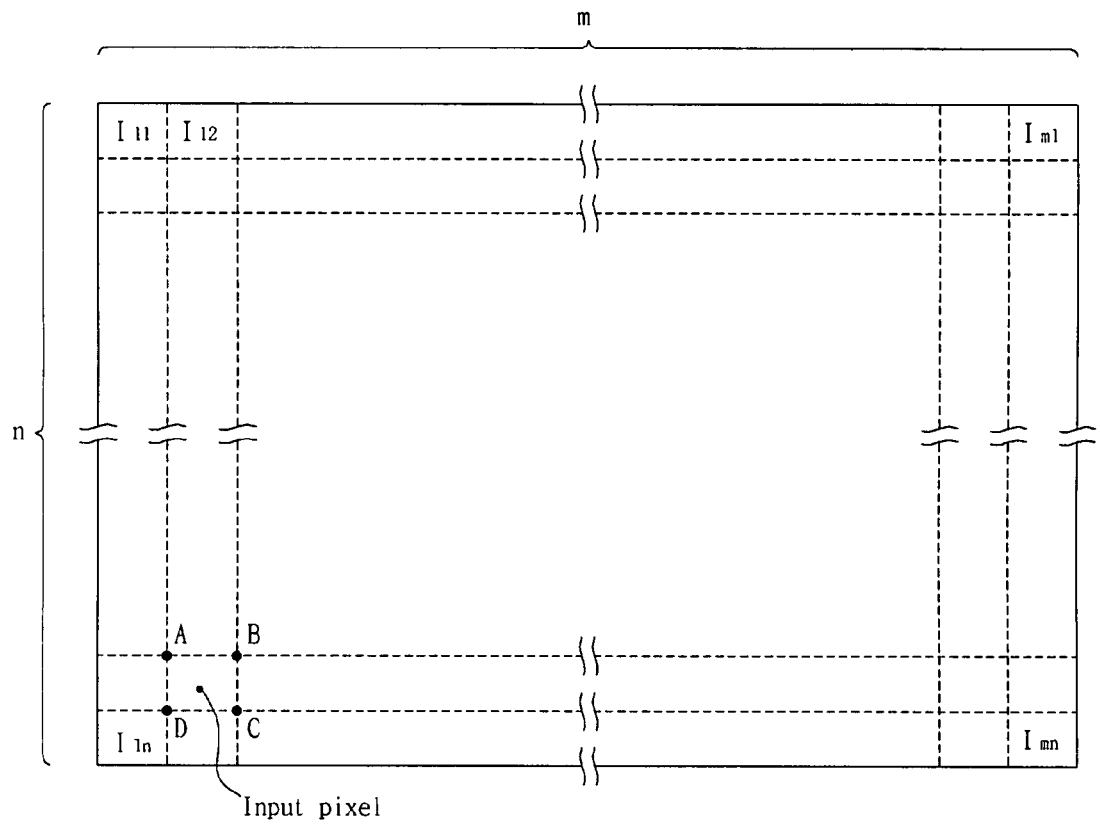

FIG. 4(b) illustrates an example of blocking and dividing an input image.

As shown in FIG. 4(b), the input image is divided into the m by n number of input image blocks (I11, I12, ..., Imn) like the reference image.

For example, the reference image block (R12) corresponds to the input image block (I12).

The input image brightness correction unit 240 corrects a brightness of the input image by multiplying brightness of input pixels comprised in the input image blocks (I11, I12, ..., Imn) by brightness weights (A11, A12, ..., Amn) of the reference image blocks (R11, R12, ..., Rmn) corresponding to the input image blocks (I11, I12, ..., Imn).

This is expressed in Equation 2:

$$CB\text{pixel} = B\text{pixel} * A_{x,y}$$

where,

CBpixel: brightness of input pixel after correction,

Bpixel: brightness of input pixel before correction, and $A_{x,y}$: brightness weight of reference image block (Rxy) corresponding to input image block (Ixy) to which input pixel belongs.

It is desirable that the brightness (Bpixel) of the input pixel is determined by processing, by linear interpolation, brightness of four corner parts of an input image block to which the input pixel belongs.

Figure 5:
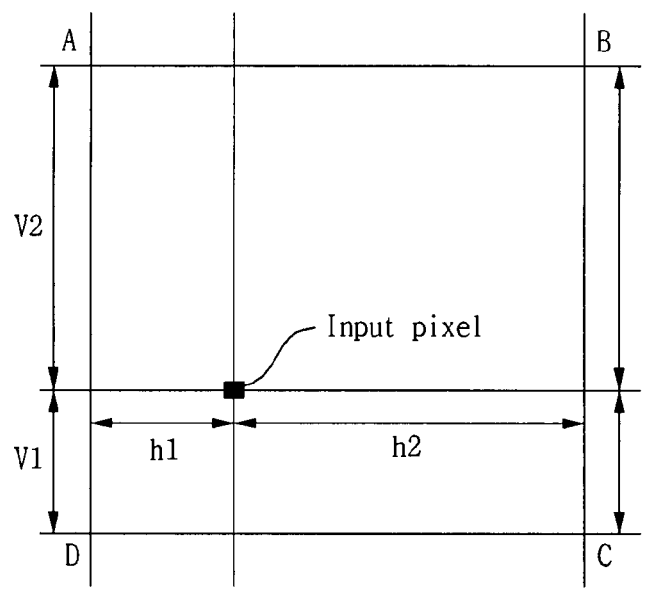
FIG. 5 illustrates a method for determining a brightness of an input pixel.

FIG. 5 schematically illustrates a method for determining a brightness of an input pixel.

As shown in FIG. 5, brightness is measured at four corner parts (A, B, C, and D), and the brightness of the input pixel is determined by processing the four measured brightness by two-dimensional linear interpolation using variables of h1, h2, V1, and V2. The h1, h2, V1, and V2 denote distances between the input pixel and the four corner parts.

By doing so, the brightness of the input pixel is corrected and displayed on a display unit 90.

Figure 6:
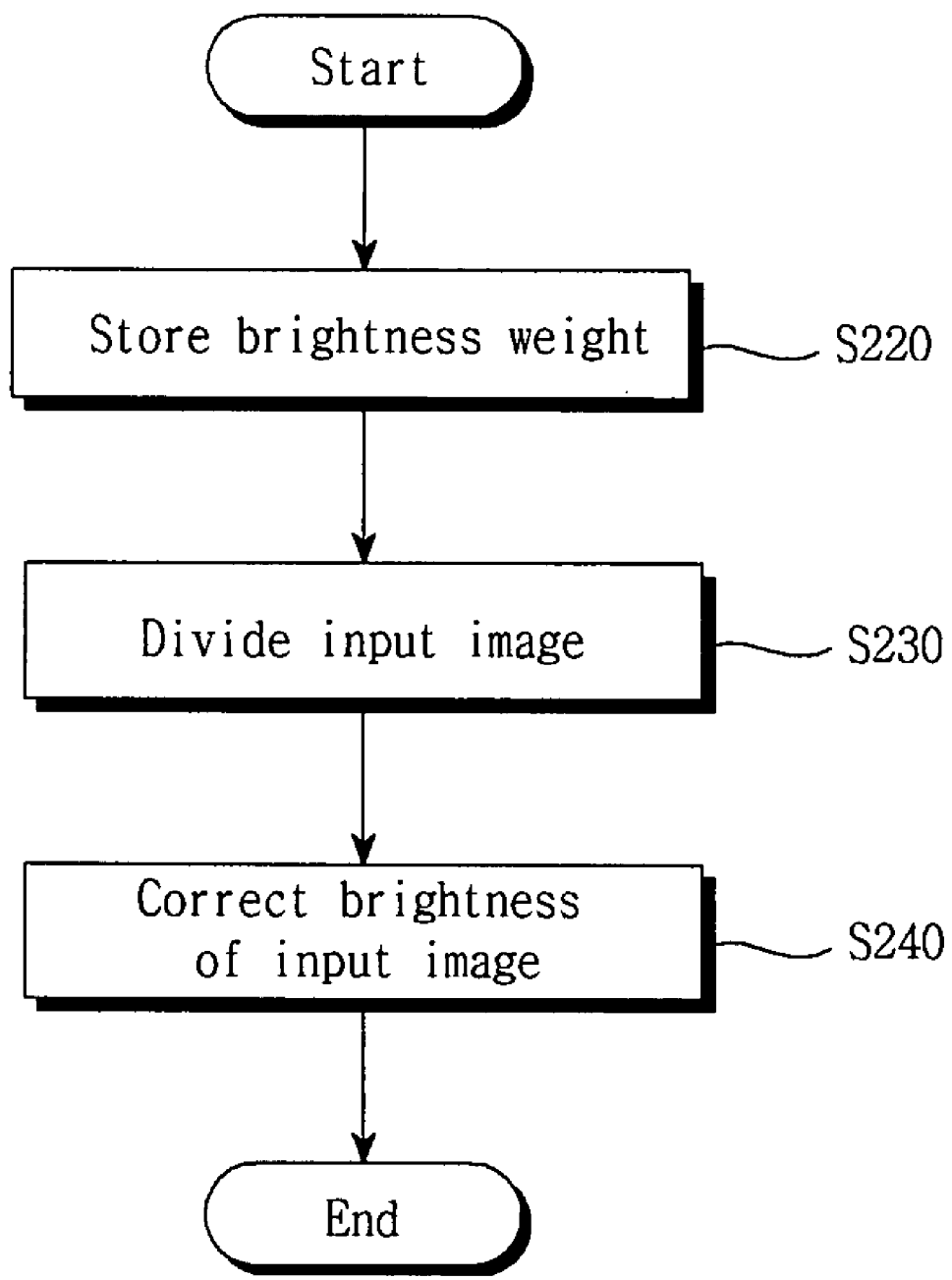
FIG. 6 is a flowchart illustrating a lens shading correction method in an image sensor according to a first exemplary embodiment of the present invention.

FIG. 6 is a flowchart illustrating a lens shading correction method in an image sensor according to a first exemplary embodiment of the present invention.

As shown in FIG. 6, the lens shading correction method in the image sensor according to a first exemplary embodiment of the present invention comprises a brightness weight storing step (S220) of storing a brightness weight for allowing one of representative brightness values of reference image blocks constituting a reference image to be a representative brightness value of a reference image block having a maximal representative brightness value among the reference image blocks; an input image dividing step (S230) of blocking and dividing an input image into input image blocks, corresponding to the reference image blocks; and an input image brightness correcting step (S240) of correcting a brightness of the input image by multiplying brightness of input pixels included in the input image blocks by brightness weights of the reference image blocks corresponding to the input image blocks.

The lens shading correction method in the image sensor according to a first exemplary embodiment of the present invention is similar in a basic principle with the above-described lens shading correction device in the image sensor according to a first exemplary embodiment of the present invention. Thus, its detailed description will be omitted and replaced with the description of the lens shading correction device.

Figure 7:
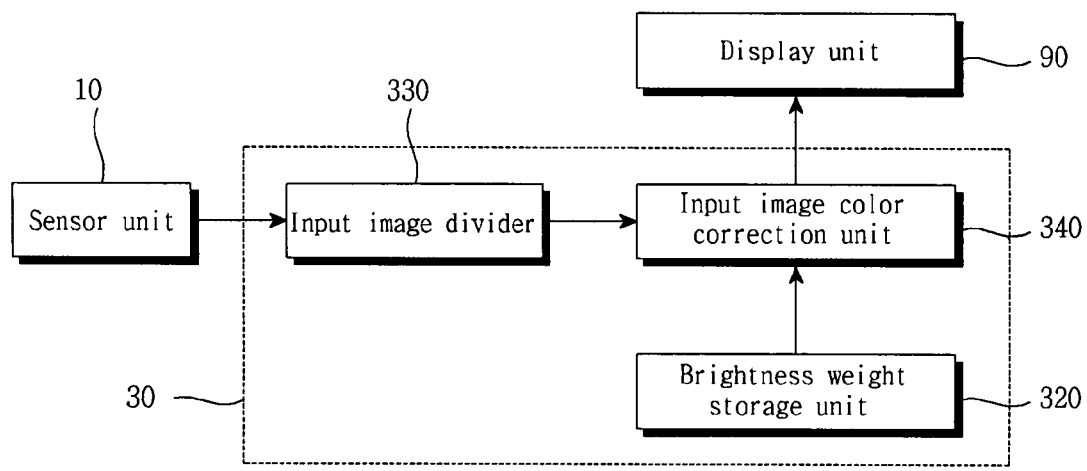
FIG. 7 is a block diagram illustrating a lens shading correction device in an image sensor according to a second exemplary embodiment of the present invention.

FIG. 7 is a block diagram illustrating a lens shading correction device in an image sensor according to a second exemplary embodiment of the present invention.

As shown in FIG. 7, the lens shading correction device 30 according to a second exemplary embodiment of the present invention includes a brightness weight storage unit 320, an input image divider 330, and an input image color correction unit 340.

The brightness weight storage unit 320 stores a brightness weight, on a per-color-information basis, for allowing one of representative brightness values of reference image blocks constituting a reference image to be a representative brightness value of a reference image block having a maximal representative brightness value among the reference image blocks.

It is desirable that the color information is R, G, and B color information or R, Gr, Gb, and B color information.

It is desirable that the reference image is a monochromatic image. The reference image can be acquired by photographing an object such as a white copy paper that has a uniform surface and emits a uniform amount of light from an entire surface. An example of the monochromatic image can be a white image obtained by photographing a white paper.

An example of dividing the reference image will be described with reference to FIG. 4(a).

As shown in FIG. 4(a), the reference image is divided into the m by n number of reference image blocks (R11, R12, Rmn).

For instance, the reference image can be divided into the 32 by 24 number of a total of 768 reference image blocks.

Representative brightness values of the reference image blocks (R11, R12, ..., Rmn) are determined and brightness weights of the reference image blocks (R11, R12, ..., Rmn) are determined on the basis of a maximal representative brightness value and are stored in a recording medium such as a semiconductor chip.

The brightness weight is determined and stored on a per-color-information basis.

For example, a brightness weight is determined and stored every R, G, and B color information or R, Gr, Gb, and B color information.

It is desirable that the representative brightness value of the reference image block is determined by averaging brightness values of reference image pixels comprised in the reference image block.

A way of determining the brightness weights of the reference image blocks (R11, R12, ..., Rmn) every R, Gr, Gb, and B color information will be described, for example.

Brightness weights of reference image blocks (R11, R12, ..., Rmn) based on R color information are expressed in Equation 3:

$$ARx, y = \frac{BR\max}{BRx, y}$$

where

ARx,y: R color information-based brightness weight of $x^{th}$ by $y^{th}$ reference image block, BRmax: R color information-based maximal representative brightness value of R color information-based representative brightness values of reference image blocks (R11, R12, ..., Rmn), and BRx,y: R color information-based representative brightness value of $x^{th}$ by $y^{th}$ reference image block.

Brightness weights of reference image blocks (R11, R12, ..., Rmn) based on Gr color information are expressed in Equation 4:

$$AGrx, y = \frac{BGr\max}{BGrx, y}$$

where

AGrx,y: Gr color information-based brightness weight of $x^{th}$ by $y^{th}$ reference image block, BGrmax: Gr color information-based maximal representative brightness value of Gr color information-based representative brightness values of reference image blocks (R11, R12, ..., Rmn), and BGrx,y: Gr color information-based representative brightness value of $x^{th}$ by $y^{th}$ reference image block.

Brightness weights of reference image blocks (R11, R12, ..., Rmn) based on Gb color information are expressed in Equation 5:

$$AGbx, y = \frac{BGb\max}{BGbx, y}$$

where

AGbx,y: Gb color information-based brightness weight of $x^{th}$ by $y^{th}$ reference image block, BGbmax: Gb color information-based maximal representative brightness value of Gb color information-based representative brightness values of reference image blocks (R11, R12, ..., Rmn), and BGbx,y: Gb color information-based representative brightness value of $x^{th}$ by $y^{th}$ reference image block.

Brightness weights of reference image blocks (R11, R12, ..., Rmn) based on B color information are expressed in Equation 6:

$$ABx, y = \frac{BB\max}{BBx, y}$$

where

ABx,y: B color information-based brightness weight of $x^{th}$ by $y^{th}$ reference image block, BBmax: B color information-based maximal representative brightness value of B color information-based representative brightness values of reference image blocks (R11, R12, ..., Rmn), and BBx,y: B color information-based representative brightness value of $x^{th}$ by $y^{th}$ reference image block.

The input image divider 330 blocks and divides an input image into input image blocks, corresponding to the reference image blocks (R11, R12, ..., Rmn).

FIG. 4(b) illustrates an example of blocking and dividing an input image.

As shown in FIG. 4(b), the input image is divided into the m by n number of input image blocks (I11, I12, ..., Imn) like the reference image.

For example, the reference image block (R12) corresponds to the input image block (I12).

The input image color correction unit 340 corrects a brightness of the input image on a per-color-information basis by multiplying brightness of input pixels comprised in the input image blocks (I11, I12, ..., Imn) by brightness weights (A11, A12, ..., Amn) of reference image blocks (R11, R12, ..., Rmn) corresponding to the input image blocks (I11, I12, ..., Imn).

A way of determining a brightness of an input pixel every R, Gr, Gb, and B color information will be described, for example.

Corrected brightness of an input pixel based on R color information is expressed in Equation 7:

$$CBRpixel = BRpixel * ARx, y$$

where,

CBRpixel: brightness of input pixel after correction based on R color information, BRpixel: brightness of input pixel before correction based on R color information, and ARx,y: R color information-based brightness weight of reference image block (Rxy) corresponding to input image block (Ixy) to which input pixel belongs.

Corrected brightness of an input pixel based on Gr color information is expressed in Equation 8:

$$CBGrpixel = BGrpixel * AGrx, y$$

where,

CBGrpixel: brightness of input pixel after correction based on Gr color information, BGrpixel: brightness of input pixel before correction based on Gr color information, and AGrx,y: Gr color information-based brightness weight of reference image block (Rxy) corresponding to input image block (Ixy) to which input pixel belongs.

Corrected brightness of an input pixel based on Gb color information is expressed in Equation 9:

$$CBGbpixel = BGbpixel * AGbx, y$$

where,

CBGbpixel: brightness of input pixel after correction based on Gb color information, BGbpixel: brightness of input pixel before correction based on Gb color information, and AGbx,y: Gb color information-based brightness weight of reference image block (Rxy) corresponding to input image block (Ixy) to which input pixel belongs.

Corrected brightness of an input pixel based on B color information is expressed in Equation 10:

$$CBBpixel = BBpixel * ABx, y$$

where,

CBBpixel: brightness of input pixel after correction based on B color information, BBpixel: brightness of input pixel before correction based on B color information, and ABx,y: B color information-based brightness weight of reference image block (Rxy) corresponding to input image block (Ixy) to which input pixel belongs.

It is desirable that a brightness (Bpixel) of an input pixel is determined by processing, by linear interpolation, brightness of four corner parts of an input image block to which the input pixel belongs. This will be described with reference to FIG. 5. Brightness are measured at four corner parts (A, B, C, and D), and a brightness of an input pixel is determined by processing the four measured brightness by two-dimensional linear interpolation using variables of h1, h2, V1, and V2. The h1, h2, V1, and V2 denote distances between the input pixel and the four corner parts.

By doing so, the present invention corrects a brightness of an input pixel on a per-color-information basis and displays the corrected brightness on a display unit 90. Thus, the lens shading correction device in the image sensor according to the present invention provides a solution to a problem that the expression of gray level based on R, G, and B color information or R, Gr, Gb, and B color information is distorted in an image region corresponding to an edge region of a lens, thereby displaying accurate color and reducing a lattice noise in the image region corresponding to the edge region of the lens.

Figure 9:
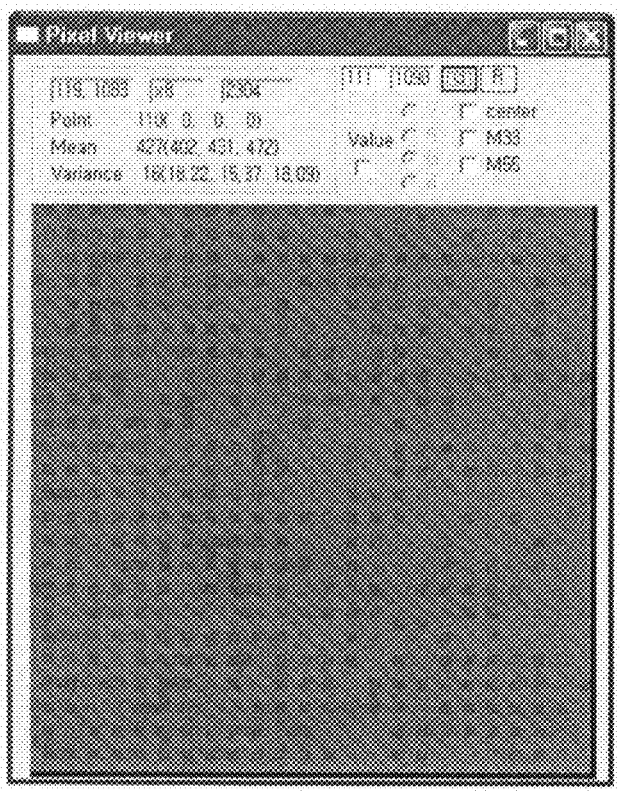
FIG. 9 illustrates an image before lens shading correction.
Figure 10:
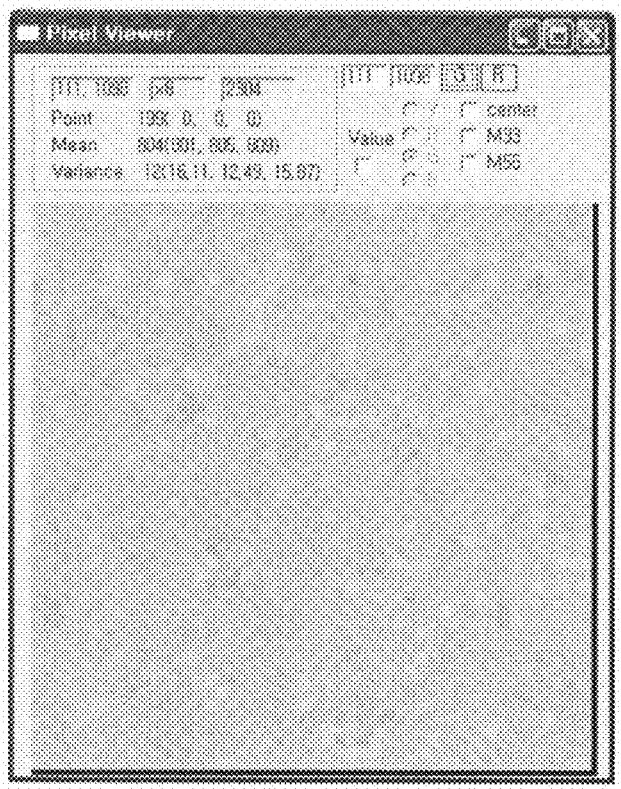
FIG. 10 illustrates an image after lens shading correction according to a second exemplary embodiment of the present invention.

FIG. 9 illustrates an image before lens shading correction. FIG. 10 illustrates an image after lens shading correction. As appreciated from FIGS. 9 and 10, it can be identified that the expression of color in an image region corresponding to an edge region of a lens is improved and a lattice noise is reduced.

Figure 8:
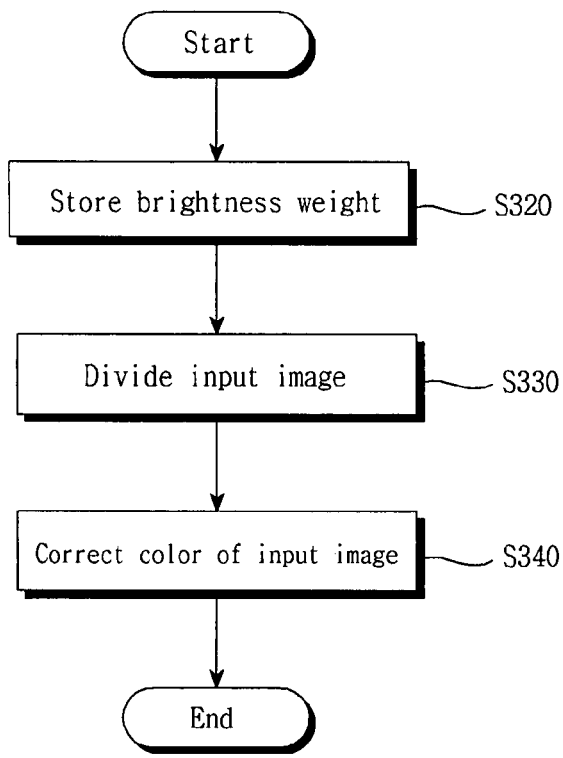
FIG. 8 is a flowchart illustrating a lens shading correction method in an image sensor according to a second exemplary embodiment of the present invention.

FIG. 8 is a flowchart illustrating a lens shading correction method in an image sensor according to a second exemplary embodiment of the present invention.

As shown in FIG. 8, the lens shading correction method in the image sensor according to a second exemplary embodiment of the present invention comprises a brightness weight storing step (S320) of storing a brightness weight, on a per-color-information basis for allowing one of representative brightness values of reference image blocks constituting a reference image to be a representative brightness value of a reference image block having a maximal representative brightness value among the reference image blocks; an input image dividing step (S330) of blocking and dividing an input image into input image blocks, corresponding to the reference image blocks; and an input image color correcting step (S340) of correcting a brightness of the input image by multiplying brightness of input pixels included in the input image blocks by brightness weights of the reference image blocks corresponding to the input image blocks.

The lens shading correction method in the image sensor according to a second exemplary embodiment of the present invention is similar in a basic principle with the above-described lens shading correction device in the image sensor according to a second exemplary embodiment of the present invention. Thus, its detailed description will be omitted and replaced with the description of the lens shading correction device.

Figure 11:
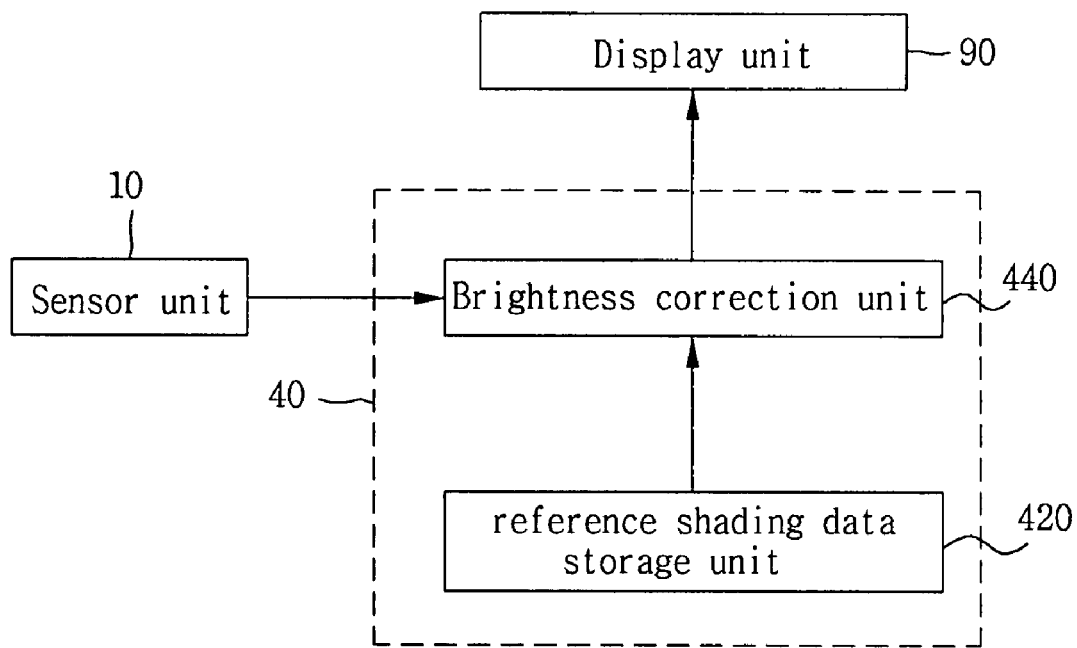
FIG. 11 is a block diagram illustrating a lens shading correction device in an image sensor according to a third exemplary embodiment of the present invention.

FIG. 11 is a block diagram illustrating a lens shading correction device in an image sensor according to a third exemplary embodiment of the present invention.

As shown in FIG. 11, the lens shading correction device in the image sensor according to a third exemplary embodiment of the present invention comprises a reference shading data storage unit 420 and a brightness correction unit 440.

The reference shading data storage unit 420 stores reference shading data that are comprised of blocked brightness information on each of a plurality of reference images having a different average brightness and correspond to the plurality of reference images.

The brightness correction unit 440 corrects a brightness of an input pixel on the basis of reference shading data that is selected among the reference shading data depending on the brightness of the input pixel, and brightness information on a target block that is selected among the blocked brightness information of the selected reference shading data depending on coordinates of the input pixel.

It is desirable that a plurality of reference images are acquired by photographing five monochromatic images having a different average brightness.

Figure 12:
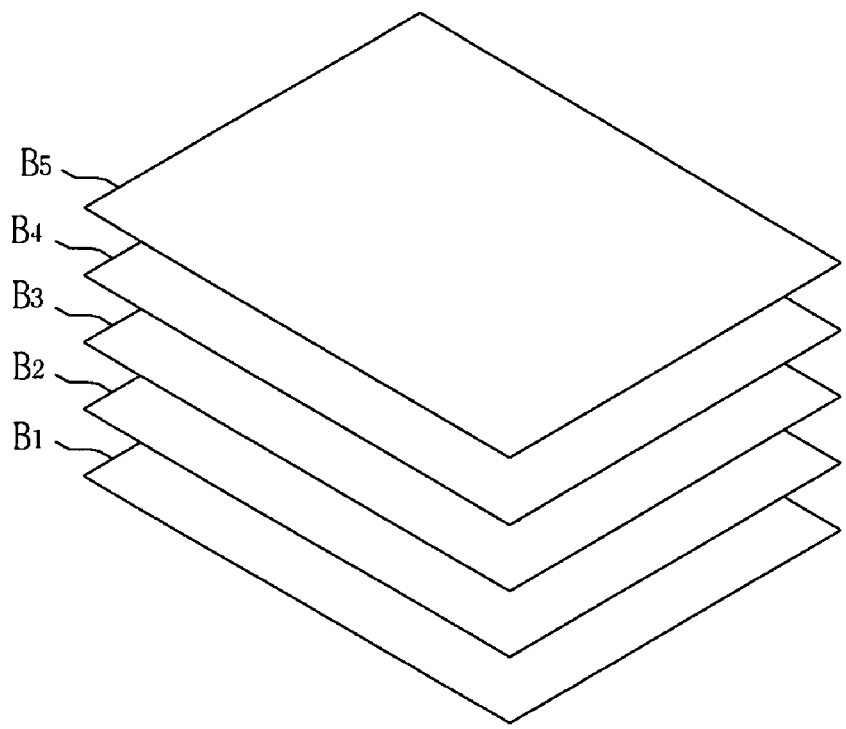
FIG. 12 illustrates an example of a plurality of reference images having a different average brightness.

FIG. 12 illustrates an example of a plurality of reference images having a different average brightness.

As shown in FIG. 12, the plurality of reference images can be comprised of five reference images having different average brightness (B1, B2, B3, B4, and B5).

It is desirable that the reference image is a monochromatic image. The reference image can be acquired by photographing an object such as a white copy paper that has a uniform surface and emits a uniform amount of light from an entire surface. An example of the monochromatic image can be a white image obtained by photographing a white paper.

It is desirable that the reference image is divided into reference image blocks, and reference shading data is made up of brightness information comprising representative brightness values of the divided reference image blocks.

Figure 13:
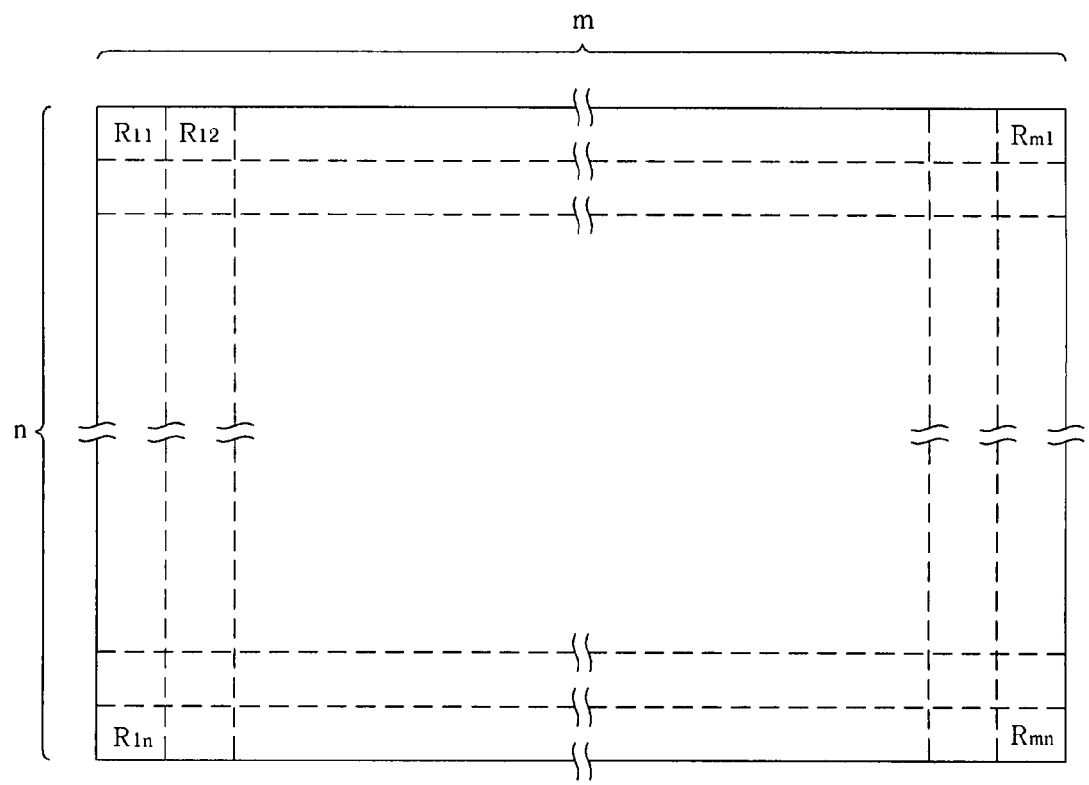
FIG. 13 illustrates an example of dividing a reference image.

FIG. 13 illustrates an example of dividing a reference image.

As shown in FIG. 13, the reference image can be divided into the m by n number of reference image blocks (R11, R12, . . . , Rmn).

Reference shading data is made up of brightness information comprising representative brightness values of the divided reference image blocks (R11, R12, . . . , Rmn). The brightness information can comprise brightness of reference image pixels comprised in the reference image blocks (R11, R12, . . . , Rmn). The reference shading data can be stored in a recording medium such as a semiconductor chip.

It is desirable that the reference shading data is determined by extracting the representative brightness values of the reference image blocks (R11, R12, . . . , Rmn) at each R, Gr, Gb, and B color information. By doing so, the present invention provides a solution to a problem that the expression of gray level based on R, Gr, Gb, and B color information is distorted in an image region corresponding to an edge region of a lens, and provides an effect of displaying accurate color in the image region corresponding to the edge region of the lens.

FIGS. 18 to 21 illustrate R, Gr, Gb, R, and B color information-based brightness weights determined by extracting the representative brightness values of the reference image blocks (R11, R12, . . . , Rmn) at each R, Gr, Gb, and B color information.

It is desirable that the representative brightness value of the reference image block is an average of brightness values of reference image pixels included in reference image blocks or an average of brightness values of partial reference image pixels of four corner parts of the reference image block.

Figure 14:
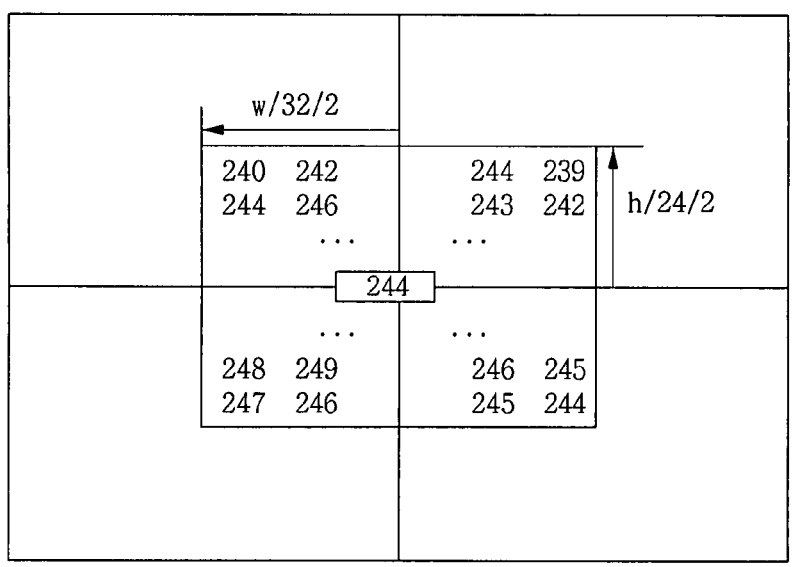
FIG. 14 illustrates an example of a method for determining a representative brightness value of a reference image block.

FIG. 14 illustrates an example of a method for determining a representative brightness value of a reference image block.

As shown in FIG. 14, the representative brightness value of the reference image block can be determined to be an average "244" of brightness values "240, 242, 244, 246, 244, 239, 243, 242, 246, 245, 245, 244, 248, 249, 247, and 246" of partial reference image pixels of four corner parts of one reference image block.

It is desirable to select a piece of reference shading data corresponding to a reference image having a minimal average brightness when a brightness of an input pixel is equal or less than the minimal average brightness, and select a piece of reference shading data corresponding to a reference image having a maximal average brightness when the brightness of the input pixel is equal or greater than the maximal average brightness.

It is desirable to select first reference shading data corresponding to a reference image having a first average brightness greater than the brightness of the input pixel and second reference shading data corresponding to a reference image having a first average brightness smaller than the brightness of the input pixel, when the brightness of the input pixel is greater than the minimal average brightness and smaller than the maximal average brightness.

Figure 15:
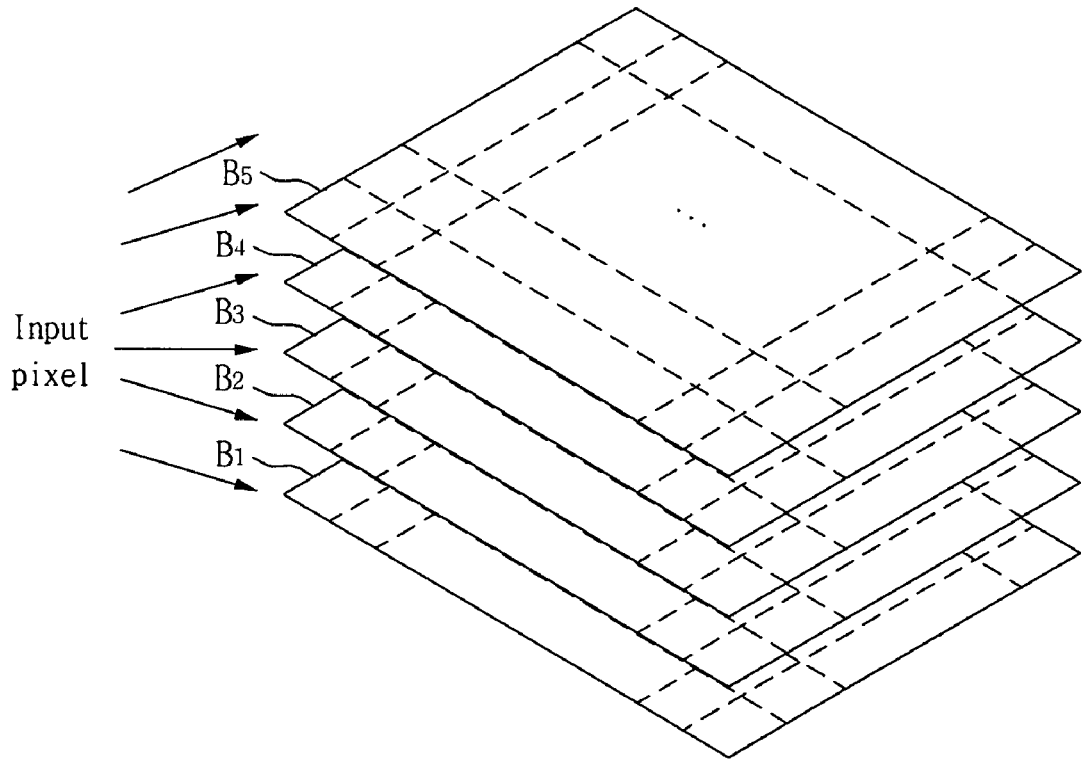
FIG. 15 illustrates an example of selecting reference shading data depending on a brightness of an input pixel.

FIG. 15 illustrates an example of selecting reference shading data depending on a brightness of an input pixel.

As shown in FIG. 15, a piece of reference shading data corresponding to a reference image having a minimal average brightness (B1) can be selected when a brightness of an input pixel is equal or less than the minimal average brightness (B1). A piece of reference shading data corresponding to a reference image having a maximal average brightness (B5) can be selected when the brightness of the input pixel is equal or greater than the maximal average brightness (B5).

Figure 16:
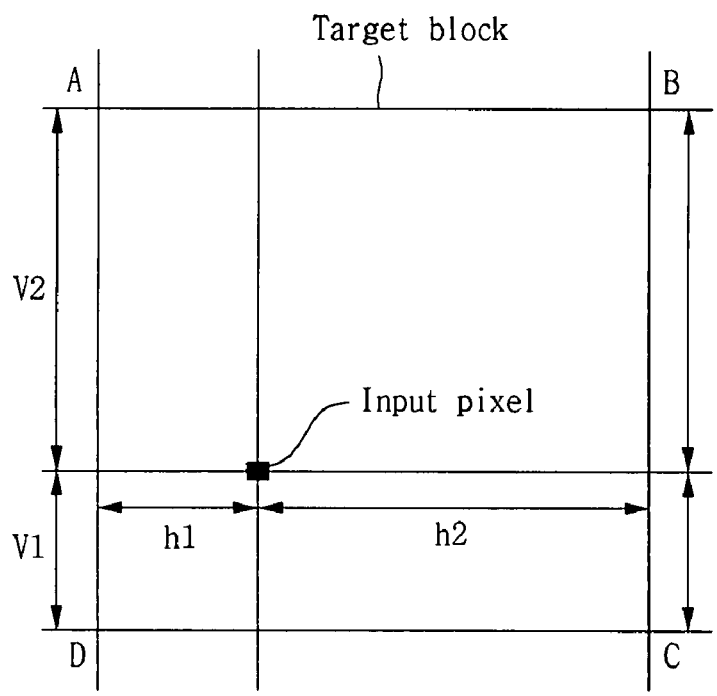
FIG. 16 illustrates an example of determining a brightness weight of an input pixel.

If the piece of reference shading data is selected as above, the following procedure is performed as shown in FIG. 16.

(1) Brightness weights of four corner parts (A, B, C, and D) of a target block are determined by dividing a maximal representative brightness value among representative brightness values of reference image blocks comprised in the selected piece of reference shading data by brightness values of the four corner parts (A, B, C, and D).

(2) A brightness weight of the input pixel is determined by processing the brightness weights of the four corner parts (A, B, C, and D) by two-dimensional linear interpolation.

(3) The brightness of the input pixel is corrected by multiplying the brightness of the input pixel by the brightness weight of the input pixel.

When the brightness of the input pixel is greater than the minimal average brightness (B1) and smaller than the maximal average brightness (B5), for example, when the brightness of the input pixel is between average brightness (B2) and (B3), first reference shading data corresponding to a reference image having the first average brightness (B3) greater than the brightness of the input pixel and second reference shading data corresponding to a reference image having the first average brightness (B2) smaller than the brightness of the input pixel can be selected.

Figure 17A:
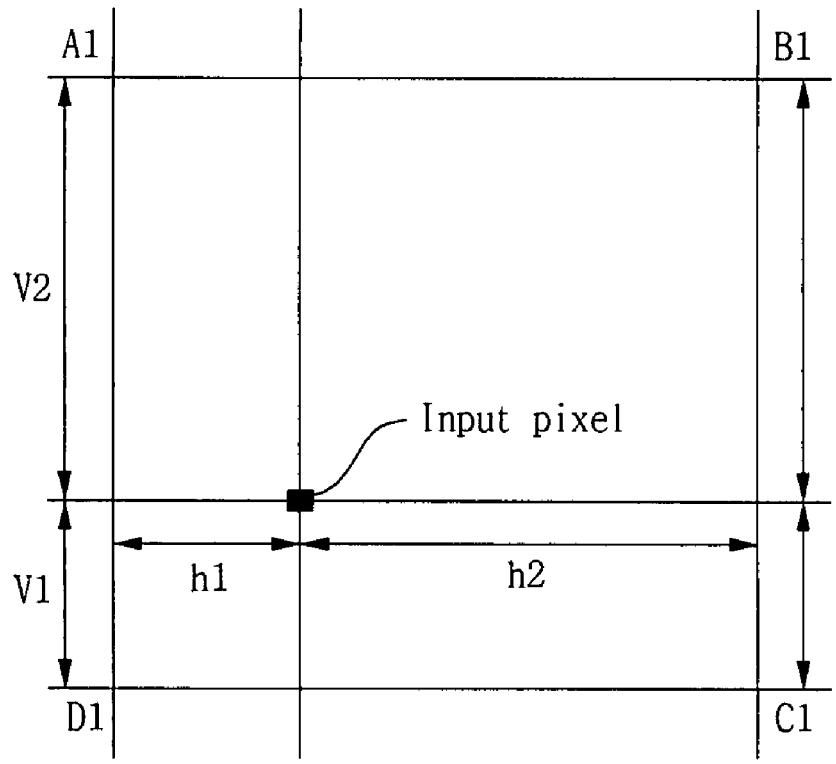
FIGS. 17(a), 17(b) and 17(c) illustrate other examples of determining a brightness weight of an input pixel.
Figure 17B:
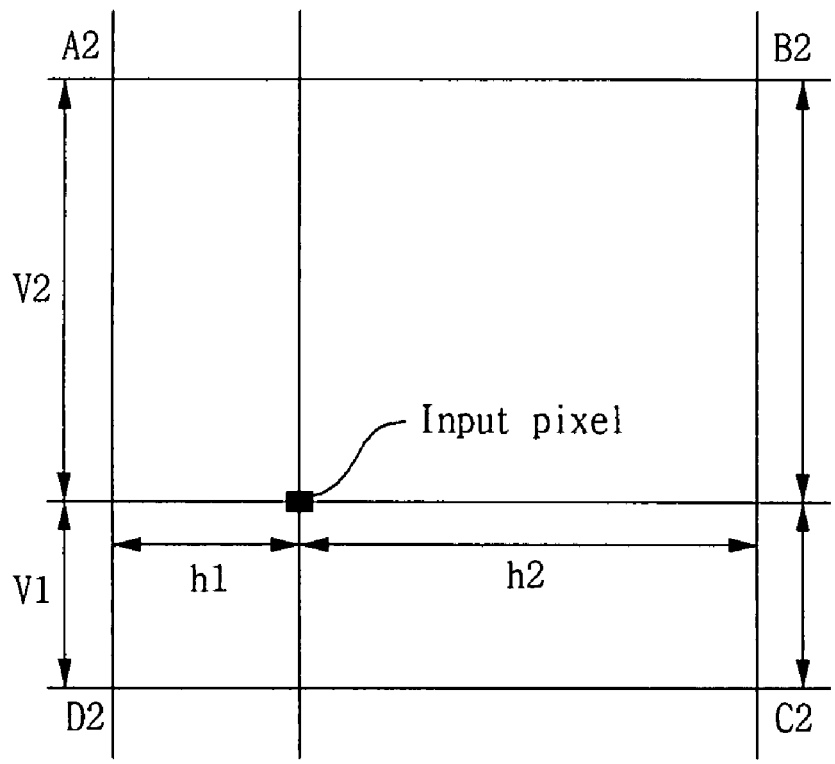
Figure 17C:
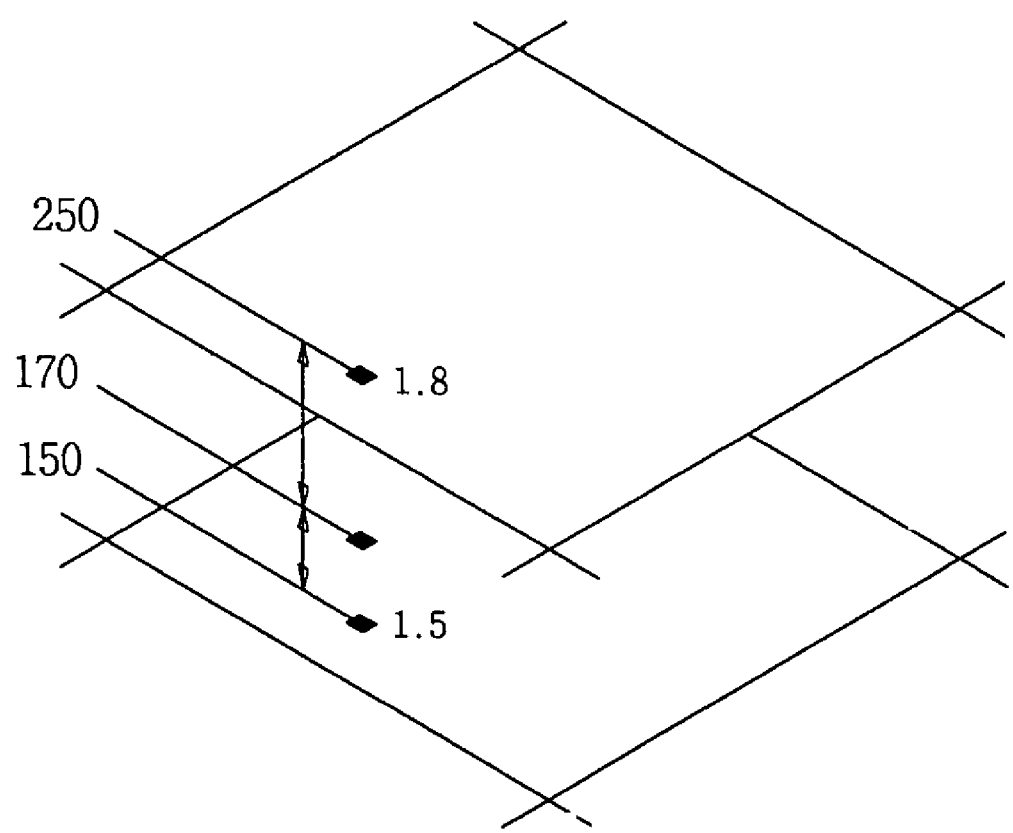
Figure 18:
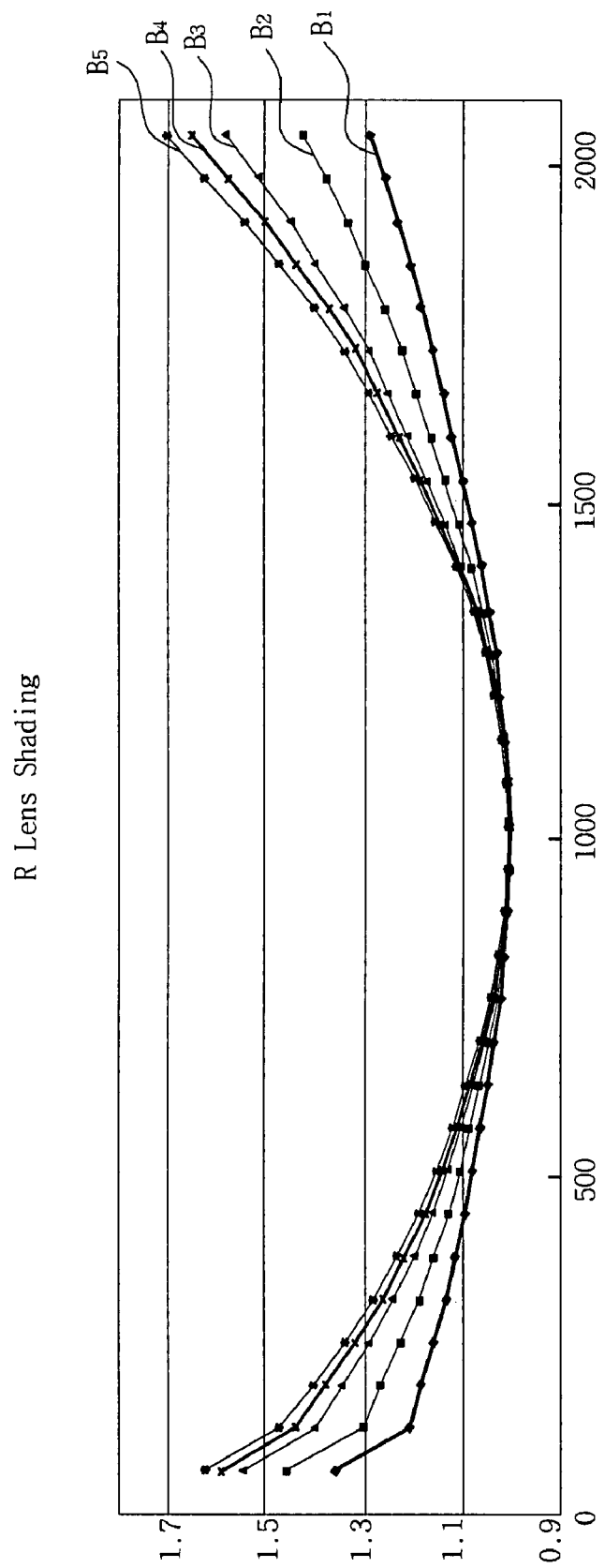
FIGS. 18 to 21 illustrate brightness weights at each Gr, Gb, R, B color information.
Figure 19:
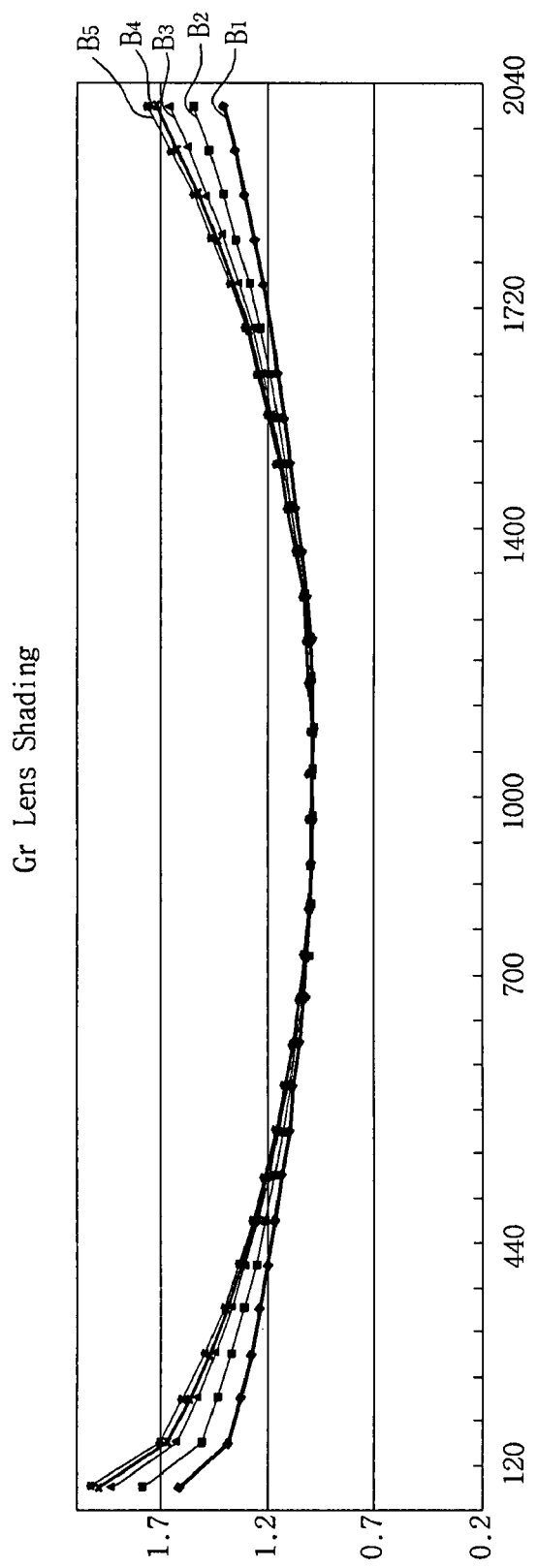
Figure 20:
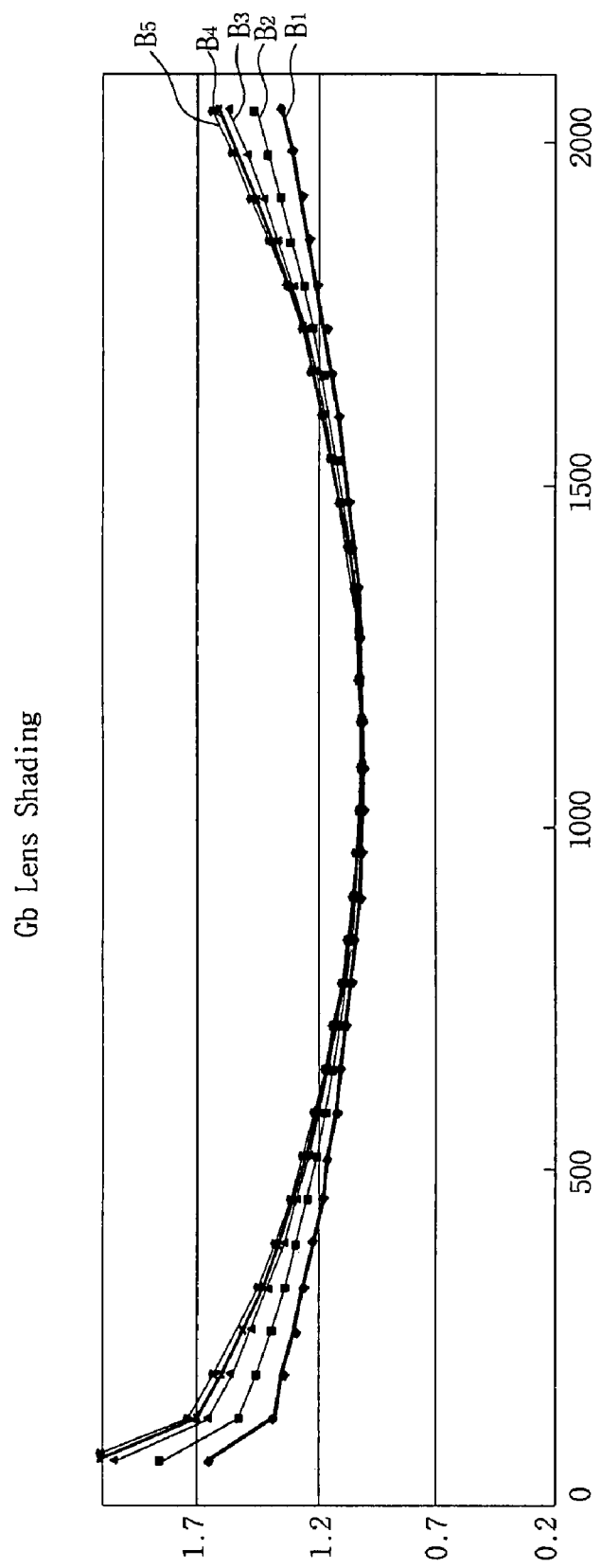
Figure 21:
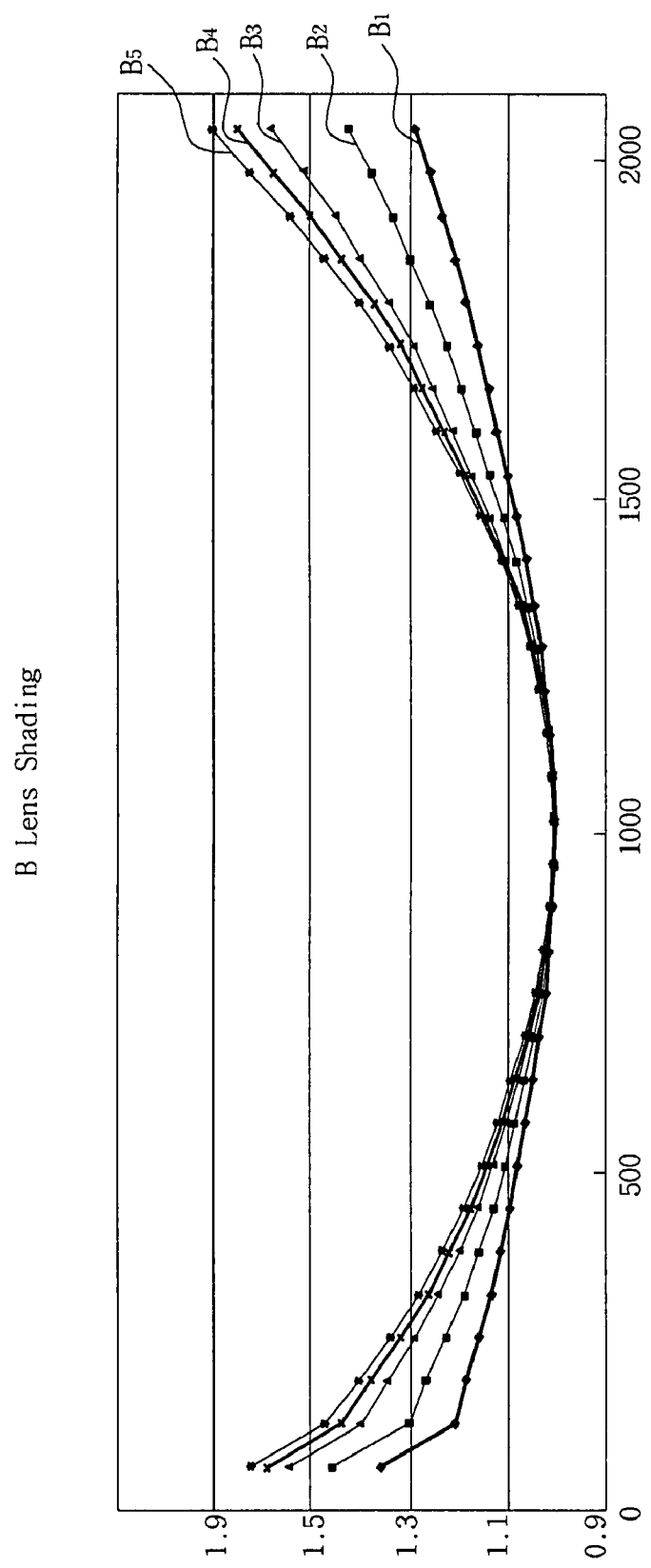

If the two pieces of reference shading data are selected as above, the following procedure is performed as shown in FIGS. 17(a)-17(c).

(1) Four first brightness weights are determined by dividing a maximal representative brightness value among representative brightness values of first reference image blocks included in the selected first reference shading data by each of brightness values of four corner parts (A1, B1, C1, and D1) of a first target block comprised in the first reference shading data.

(2) A first reference brightness weight is determined by processing the first brightness weights by two-dimensional linear interpolation.

(3) Four second brightness weights are determined by dividing a maximal representative brightness value among representative brightness values of second reference image blocks comprised in the selected second reference shading data by each of brightness values of four corner parts (A2, B2, C2, and D2) of a second target block comprised in the second reference shading data.

(4) A second reference brightness weight is determined by processing the second brightness weights by two-dimensional linear interpolation.

(5) A brightness weight of the input pixel is determined by processing, by proportional calculation, an average brightness between the first reference shading data and the second reference shading data, the first reference brightness weight, the second reference brightness weight, and the brightness of the input pixel.

For example, as shown in FIG. 17(c), the brightness weight (X) of the input pixel is equal to 1.56 by proportional calculation when an average brightness of the first reference shading data is equal to 255, an average brightness of the second reference shading data is equal to 150, the first reference brightness weight is equal to 1.8, the second reference brightness weight is equal to 1.5, and the brightness of the input pixel is equal to 170. This is expressed in Equation 11:

$$250-150:1.8-1.5=250-170:1.8-X$$

(6) The brightness of the input pixel is corrected by multiplying the brightness of the input pixel by the brightness weight (X) of the input pixel.

Figure 22:
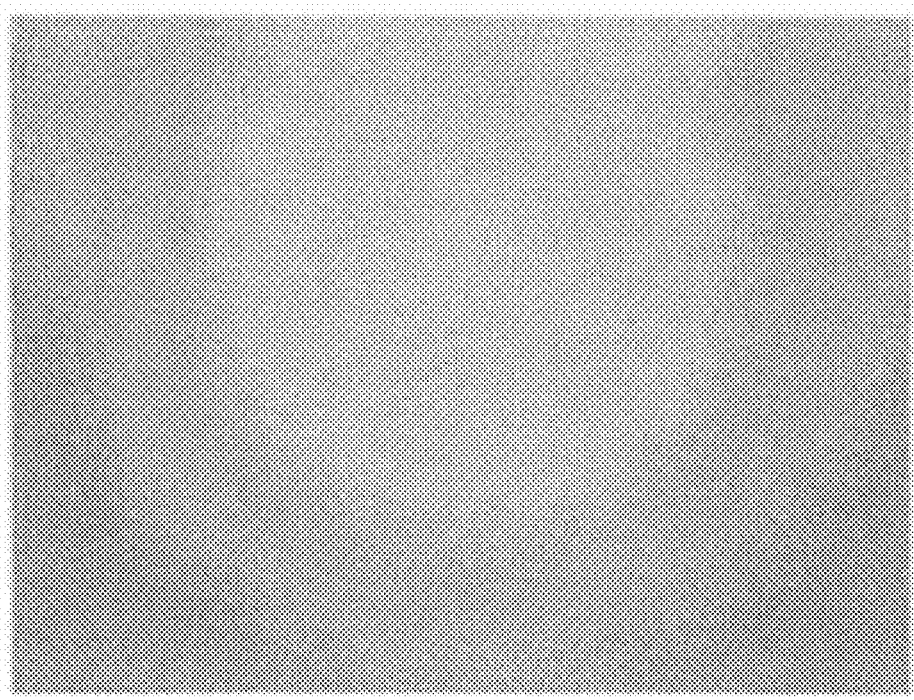
FIG. 22 illustrates an image before brightness correction.
Figure 23:
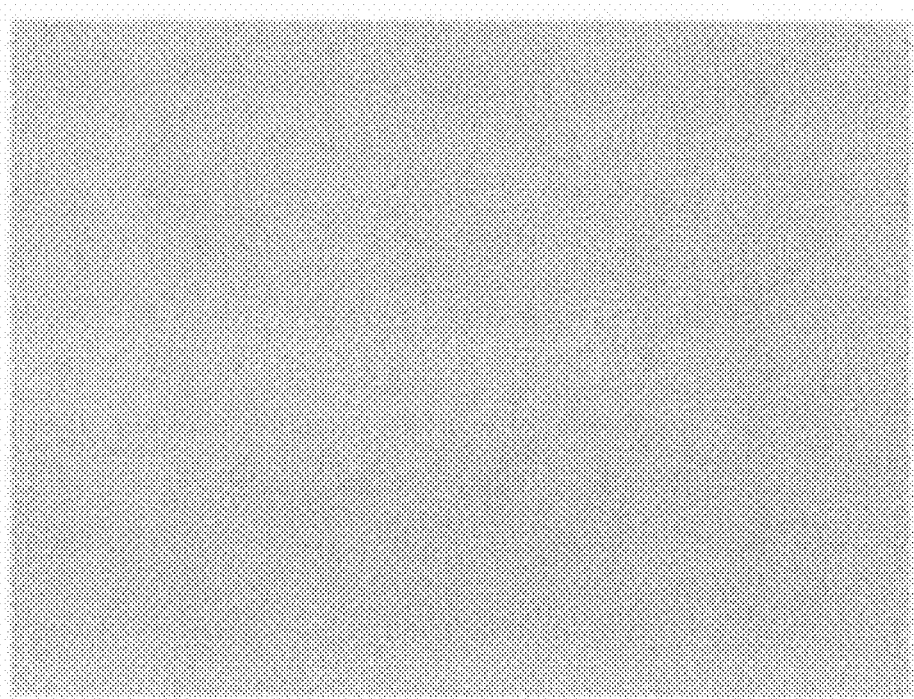
FIG. 23 illustrates an image after brightness correction according to a third exemplary embodiment of the present invention.

FIG. 22 illustrates a photograph of an image before brightness correction. FIG. 23 illustrates a photograph of an image in which lens shading is corrected by the lens shading correction device in the image sensor according to a third exemplary embodiment of the present invention.

Figure 24:
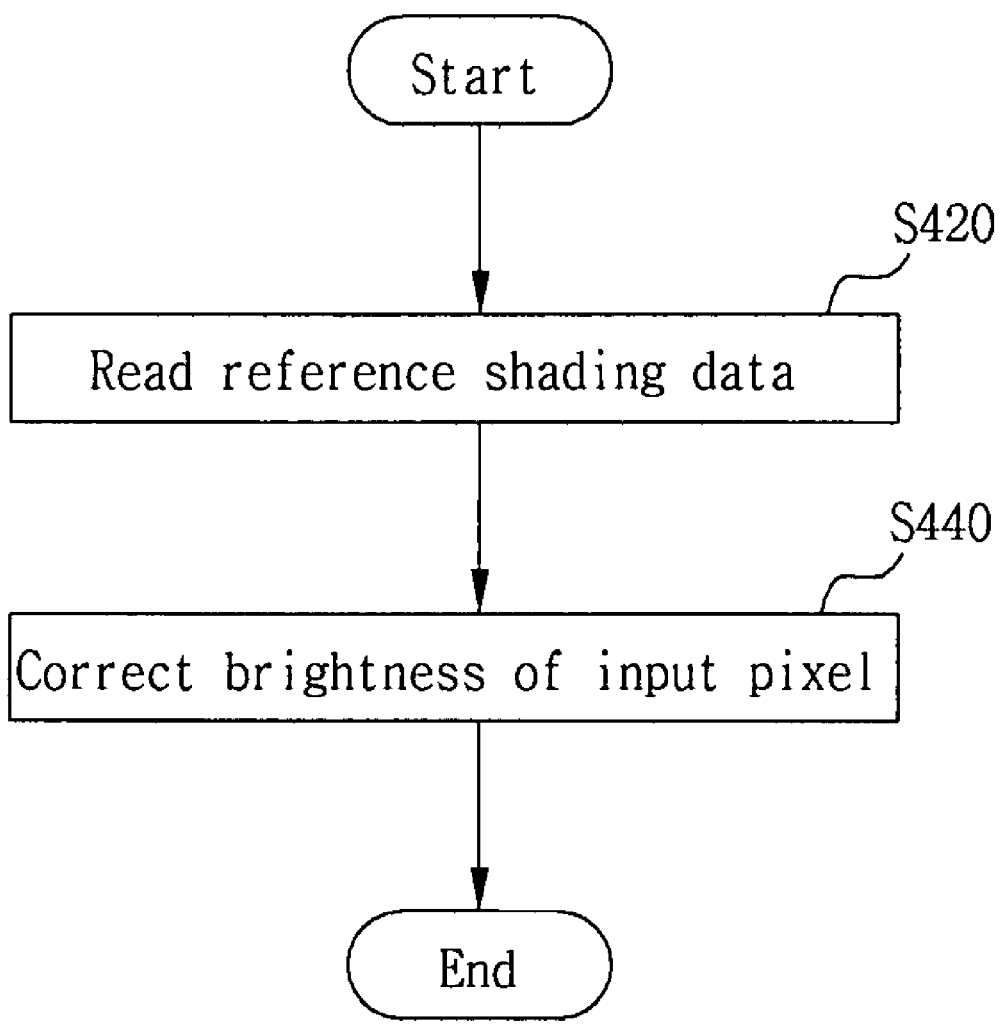
FIG. 24 is a flowchart illustrating a lens shading correction method in an image sensor according to a third exemplary embodiment of the present invention.

FIG. 24 is a flowchart illustrating a lens shading correction method in an image sensor according to a third exemplary embodiment of the present invention.

As shown in FIG. 24, the lens shading correction method in the image sensor according to a third exemplary embodiment of the present invention comprises a step (S420) of reading reference shading data that are comprised of blocked brightness information on each of a plurality of reference images having a different reference average brightness and correspond to the plurality of reference images; and a brightness correcting step (S440) of correcting a brightness of an input pixel on the basis of reference shading data that is selected among reference shading data depending on the brightness of the input pixel, and brightness information on a target block that is selected among the blocked brightness information of the selected reference shading data depending on coordinates of the input pixel.

The lens shading correction method in the image sensor according to a third exemplary embodiment of the present invention is similar in a basic principle with the above described lens shading correction device in the image sensor according to a third exemplary embodiment of the present invention. Thus, its detailed description will be omitted and replaced with the description of the lens shading correction device.

As described above, the present invention has an effect of compensating the lens shading of the image sensor and improving a quality of the image sensor.

Also, the present invention provides a solution to a problem that a brightness of an edge region of a displayed image is reduced, thereby improving a quality of the image sensor.

Also, the present invention provides a solution to a problem that the expression of gray level based on R, G, and B color information is distorted in the image region corresponding to the edge region of the lens, thereby displaying accurate color and reducing a lattice noise in the image region corresponding to the edge region of the lens.

Also, the present invention provides a solution to a problem that the expression of gray level based on R, G, and B color information is distorted in the image region corresponding to the edge region of the lens because of a change of a brightness environment in which an object is photographed, thereby realizing a stable color display despite the change of the brightness environment.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A lens shading correction device in an image sensor, the device comprising:
   a reference shading data storage unit configured to store reference shading data that include blocked brightness information on each of a plurality of reference images having a different average brightness and correspond to the plurality of reference images; and
   a brightness correction unit configured to correct a brightness of an input pixel on the basis of reference shading data that is selected among the reference shading data depending on the brightness of the input pixel, and brightness information on a target block that is selected among the blocked brightness information of the selected reference shading data depending on coordinates of the input pixel,
   wherein the reference image is divided into reference image blocks,
   wherein the reference shading data includes brightness information comprising representative brightness values of the divided reference image blocks,
   wherein a piece of reference shading data corresponding to a reference image having a minimal average brightness is selected when the brightness of the input pixel is equal or less than the minimal average brightness, and a piece of reference shading data corresponding to a reference image having a maximal average brightness is selected when the brightness of the input pixel is equal or greater than the maximal average brightness,
   wherein brightness weights of four corner parts of a target block are determined by dividing a maximal representative brightness value among representative brightness values of reference image blocks comprised in the selected piece of reference shading data by brightness values of the four corner parts of the target block,
   wherein a brightness weight of the input pixel is determined by processing the brightness weights of the four corner parts by two-dimensional linear interpolation, and
   wherein the brightness of the input pixel is corrected by multiplying the brightness of the input pixel by the brightness weight of the input pixel.

2. A lens shading correction device in an image sensor, the device comprising:
   a reference shading data storage unit configured to store reference shading data that include blocked brightness information on each of a plurality of reference images having a different average brightness and correspond to the plurality of reference images; and
   a brightness correction unit configured to correct a brightness of an input pixel on the basis of reference shading data that is selected among the reference shading data depending on the brightness of the input pixel, and brightness information on a target block that is selected among the blocked brightness information of the selected reference shading data depending on coordinates of the input pixel,
   wherein the reference image is divided into reference image blocks,
   wherein the reference shading data includes brightness information comprising representative brightness values of the divided reference image blocks,
   wherein the representative brightness value of the reference image block is an average of brightness values of partial reference image pixels which are located at four corner parts of the reference image block among reference image pixels included in the reference image block.

3. The device of claim 2, wherein the reference shading data is determined by extracting the representative brightness values of the reference image blocks at each R, Gr, Gb, and B color information.

4. The device of claim 2, wherein the plurality of reference images are acquired by photographing five monochromatic images having a different average brightness.

5. The device of claim 2, wherein the representative brightness value of the reference image block is an average of brightness values of reference image pixels included in the reference image blocks.

6. The device according to claim 2, wherein a piece of reference shading data corresponding to a reference image having a minimal average brightness is selected when the brightness of the input pixel is equal or less than the minimal average brightness, and a piece of reference shading data corresponding to a reference image having a maximal average brightness is selected when the brightness of the input pixel is equal or greater than the maximal average brightness.

7. The device of claim 6, wherein brightness weights of four corner parts of a target block are determined by dividing a maximal representative brightness value among representative brightness values of reference image blocks comprised in the selected piece of reference shading data by brightness values of the four corner parts of the target block,
   wherein a brightness weight of the input pixel is determined by processing the brightness weights of the four corner parts by two-dimensional linear interpolation, and
   wherein the brightness of the input pixel is corrected by multiplying the brightness of the input pixel by the brightness weight of the input pixel.

8. The device according to claim 2, wherein first reference shading data corresponding to a reference image having a first average brightness greater than the brightness of the input pixel and second reference shading data corresponding to a reference image having a first average brightness smaller than the brightness of the input pixel are selected when the brightness of the input pixel is greater than a minimal average brightness and smaller than a maximal average brightness.

9. A lens shading correction device in an image sensor, the device comprising:
   a reference shading data storage unit configured to store reference shading data that include blocked brightness information on each of a plurality of reference images having a different average brightness and correspond to the plurality of reference images; and
   a brightness correction unit configured to correct a brightness of an input pixel on the basis of reference shading data that is selected among the reference shading data depending on the brightness of the input pixel, and brightness information on a target block that is selected among the blocked brightness information of the selected reference shading data depending on coordinates of the input pixel, wherein the reference image is divided into reference image blocks, wherein the reference shading data includes brightness information comprising representative brightness values of the divided reference image blocks, wherein first reference shading data corresponding to a reference image having a first average brightness greater than the brightness of the input pixel and second reference shading data corresponding to a reference image having a first average brightness smaller than the brightness of the input pixel are selected when the brightness of the input pixel is greater than a minimal average brightness and smaller than a maximal average brightness, wherein four first brightness weights are determined by dividing a maximal representative brightness value among representative brightness values of first reference image blocks included in the selected first reference shading data by each of brightness values of four corner parts of a first target block comprised in the first reference shading data, wherein a first reference brightness weight is determined by processing the first brightness weights by two-dimensional linear interpolation, wherein four second brightness weights are determined by dividing a maximal representative brightness value among representative brightness values of second reference image blocks included in the selected second reference shading data by each of brightness values of four corner parts of a second target block comprised in the second reference shading data, wherein a second reference brightness weight is determined by processing the second brightness weights by two-dimensional linear interpolation, wherein a brightness weight of the input pixel is determined by processing, by proportional calculation, an average brightness between the first reference shading data and the second reference shading data, the first reference brightness weight, the second reference brightness weight, and the brightness of the input pixel, and wherein the brightness of the input pixel is corrected by multiplying the brightness of the input pixel by the brightness weight of the input pixel.

10. A lens shading correction method performed by an image sensor, the method comprising:

reading, by the image sensor, reference shading data that include blocked brightness information on each of a plurality of reference images having a different average brightness and correspond to the plurality of reference images; and correcting, by the image sensor, a brightness of an input pixel on the basis of reference shading data that is selected among the reference shading data depending on the brightness of the input pixel, and brightness information on a target block that is selected among the blocked brightness information of the selected reference shading data depending on coordinates of the input pixel;

selecting, by the image sensor, a piece of reference shading data corresponding to a reference image having a minimal average brightness when the brightness of the input pixel is equal or less than the minimal average brightness; and selecting, by the image sensor, a piece of reference shading data corresponding to a reference image having a maximal average brightness when the brightness of the input pixel is equal or greater than the maximal average brightness;

determining, by the image sensor, brightness weights of four corner parts of a target block by dividing a maximal representative brightness value among representative brightness values of reference image blocks included in the selected piece of reference shading data by brightness values of the four corner parts;

determining, by the image sensor, a brightness weight of the input pixel by processing the brightness weights of the four corner parts by two-dimensional linear interpolation; and correcting, by the image sensor, the brightness of the input pixel by multiplying the brightness of the input pixel by the brightness weight of the input pixel, wherein the reference image is divided into reference image blocks, and wherein the reference shading data includes brightness information comprising representative brightness values of the divided reference image blocks.

11. A lens shading correction method performed by an image sensor, the method comprising:

reading, by the image sensor, reference shading data that include blocked brightness information on each of a plurality of reference images having a different average brightness and correspond to the plurality of reference images; and correcting, by the image sensor, a brightness of an input pixel on the basis of reference shading data that is selected among the reference shading data depending on the brightness of the input pixel, and brightness information on a target block that is selected among the blocked brightness information of the selected reference shading data depending on coordinates of the input pixel, wherein the reference image is divided into reference image blocks, wherein the reference shading data includes brightness information comprising representative brightness values of the divided reference image blocks, wherein the representative brightness value of the reference image block is an average of brightness values of partial reference image pixels which are located at four corner parts of the reference image block among reference image pixels included in the reference image block.

12. The method of claim 11, further comprising:

determining the reference shading data by extracting the representative brightness values of the reference image blocks at each R, Gr, Gb, and B color information.

13. The method of claim 11, further comprising:

acquiring the plurality of reference images by photographing five monochromatic images having a different average brightness.

14. The method of claim 11, wherein the representative brightness value of the reference image block is an average of brightness values of reference image pixels included in the reference image blocks.

15. The method of claim 11, further comprising:

selecting, by the image sensor, a piece of reference shading data corresponding to a reference image having a minimal average brightness when the brightness of the input pixel is equal or less than the minimal average brightness; and selecting, by the image sensor, a piece of reference shading data corresponding to a reference image having a maximal average brightness when the brightness of the input pixel is equal or greater than the maximal average brightness.

16. The method of claim 15, further comprising:

determining, by the image sensor, brightness weights of four corner parts of a target block by dividing a maximal representative brightness value among representative brightness values of reference image blocks included in the selected piece of reference shading data by brightness values of the four corner parts;

determining, by the image sensor, a brightness weight of the input pixel by processing the brightness weights of the four corner parts by two-dimensional linear interpolation; and correcting, by the image sensor, the brightness of the input pixel by multiplying the brightness of the input pixel by the brightness weight of the input pixel.

17. The method of claim 11, further comprising:

selecting, by the image sensor, first reference shading data corresponding to a reference image having a first average brightness greater than the brightness of the input pixel and second reference shading data corresponding to a reference image having a first average brightness smaller than the brightness of the input pixel, when the brightness of the input pixel is greater than a minimal average brightness and smaller than a maximal average brightness.

18. A lens shading correction method performed by an image sensor, comprising:

reading, by the image sensor, reference shading data that include blocked brightness information on each of a plurality of reference images having a different average brightness and correspond to the plurality of reference images; and correcting, by the image sensor, a brightness of an input pixel on the basis of reference shading data that is selected among the reference shading data depending on the brightness of the input pixel, and brightness information on a target block that is selected among the blocked brightness information of the selected reference shading data depending on coordinates of the input pixel;

selecting, by the image sensor, first reference shading data corresponding to a reference image having a first average brightness greater than the brightness of the input pixel and second reference shading data corresponding to a reference image having a first average brightness smaller than the brightness of the input pixel, when the brightness of the input pixel is greater than a minimal average brightness and smaller than a maximal average brightness;

determining, by the image sensor, four first brightness weights by dividing a maximal representative brightness value among representative brightness values of first reference image blocks included in the selected first reference shading data by each of brightness values of four corner parts of a first target block comprised in the first reference shading data;

determining, by the image sensor, a first reference brightness weight by processing the first brightness weights by two-dimensional linear interpolation;

determining, by the image sensor, four second brightness weights by dividing a maximal representative brightness value among representative brightness values of second reference image blocks included in the selected second reference shading data by each of brightness values of four corner parts of a second target block included in the second reference shading data;

determining, by the image sensor, a second reference brightness weight by processing the second brightness weights by two-dimensional linear interpolation;

determining, by the image sensor, a brightness weight of the input pixel by processing, by proportional calculation, an average brightness between the first reference shading data and the second reference shading data, the first reference brightness weight, the second reference brightness weight, and the brightness of the input pixel; and correcting, by the image sensor, the brightness of the input pixel by multiplying the brightness of the input pixel by the brightness weight of the input pixel, wherein the reference image is divided into reference image blocks, and wherein the reference shading data includes brightness information comprising representative brightness values of the divided reference image blocks.

* * * * *